United States Patent
Wang et al.

(10) Patent No.: US 11,073,667 B1
(45) Date of Patent: Jul. 27, 2021

(54) PLUGGABLE TRANSCEIVER RETAINER

(71) Applicant: FINISAR CORPORATION, Sunnyvale, CA (US)

(72) Inventors: William H. Wang, Pleasanton, CA (US); Bill S. Wang, San Jose, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 0 days.

(21) Appl. No.: 16/809,392

(22) Filed: Mar. 4, 2020

(51) Int. Cl.
*H01R 13/627* (2006.01)
*G02B 6/42* (2006.01)
*H01R 13/633* (2006.01)
*H01R 43/26* (2006.01)
*H01R 13/639* (2006.01)

(52) U.S. Cl.
CPC ....... *G02B 6/4261* (2013.01); *H01R 13/6272* (2013.01); *H01R 13/639* (2013.01); *H01R 13/6335* (2013.01); *H01R 43/26* (2013.01)

(58) Field of Classification Search
CPC .. G02B 6/4261; H01R 43/26; H01R 13/6272; H01R 13/639; H01R 43/16
USPC ........................................................ 439/352
See application file for complete search history.

(56) References Cited

U.S. PATENT DOCUMENTS

| | | | | |
|---|---|---|---|---|
| 7,083,336 B2* | 8/2006 | Kim | ..................... | G02B 6/4292 385/88 |
| 7,114,980 B1* | 10/2006 | Wu | ..................... | H01R 13/6275 439/352 |
| 2002/0150343 A1* | 10/2002 | Chiu | ..................... | G02B 6/3897 385/53 |
| 2007/0243749 A1* | 10/2007 | Wu | ..................... | H01R 13/6596 439/352 |
| 2009/0209125 A1* | 8/2009 | Bright | ................ | H01R 13/6275 439/352 |
| 2013/0115800 A1* | 5/2013 | Chan | .................. | H01R 13/6335 439/372 |
| 2019/0312645 A1* | 10/2019 | Ishii | ..................... | G02B 6/4246 |

* cited by examiner

*Primary Examiner* — Abdullah A Riyami
*Assistant Examiner* — Nelson R. Burgos-Guntin
(74) *Attorney, Agent, or Firm* — Blank Rome LLP

(57) ABSTRACT

An optoelectronic module may include a housing enclosing at least one optical transmitter or receiver, and a slider configured to move with respect to the housing. The slider may include at least one protrusion configured to engage with a cage sized and shaped to receive the housing, and a retainer configured to engage both the slider and the housing to retain the slider with respect to the housing. The retainer may include a first protrusion sized and shaped to be positioned in a slot defined by the housing, and a second protrusion sized and shaped to abut the slider.

20 Claims, 15 Drawing Sheets

PLUGGABLE TRANSCEIVER RETAINER

FIELD

The present disclosure relates to retainers for optoelectronic modules.

BACKGROUND

Unless otherwise indicated herein, the materials described herein are not prior art to the claims in the present application and are not admitted to be prior art by inclusion in this section.

Optoelectronic modules, such as transceivers, may be used to transmit data between different devices or different locations. In particular, optical signals may be used to rapidly communication data (via the optical signals) between different devices or different locations. However, most electronic devices operate using electrical signals. Accordingly, optoelectronic modules may be used to convert optical signals to electrical signals or convert electrical signals to optical electrical, so optical signals may be used to transmit data between electronic devices. Optoelectronic modules typically communicate with a host device by transmitting electrical signals to the host device and receiving electrical signals from the host device. These electrical signals may then be transmitted by the optoelectronic module as optical signals.

One type of host device that may be implemented with optoelectronic modules is a network switch. A network switch may include multiple ports or cages to receive optoelectronic modules. In some configurations, the optoelectronic modules may include a coupling mechanism such as a latch to retain the optoelectronic modules in their respective ports or cages in the network switch. The coupling mechanism may also permit the optoelectronic modules to be removed from the ports or cages. However, in some circumstances, an optoelectronic module may unintentionally disengage from its port or cage.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example, an optoelectronic module may include a housing enclosing at least one optical transmitter or receiver, and a slider configured to move with respect to the housing. The slider may include at least one protrusion configured to engage with a cage sized and shaped to receive the housing, and a retainer configured to engage both the slider and the housing to retain the slider with respect to the housing. The retainer may include a first protrusion sized and shaped to be positioned in a slot defined by the housing, and a second protrusion sized and shaped to abut the slider.

The retainer may include a body portion extending between two oppositely positioned sides, and the first protrusion or the second protrusion is positioned on one of the sides.

In some embodiments, the first protrusion may be positioned on the body portion and the second protrusion may be positioned on one of the sides. The first protrusion may extend transverse to the body portion and the second protrusion may extend transverse to the sides. The second protrusions may be positioned within and is surrounded by an opening defined in the sides of the retainer. The second protrusion may be sized and shaped to be positioned in a slot cooperatively defined between the slider and a handle. The handle may be coupled to the slider. The first protrusion and the second protrusion may extend towards an interior of the retainer.

In some embodiments, the first protrusion and the second protrusion may be positioned on the sides of the retainer. The first protrusion and the second protrusion may extend transverse to the sides. The first protrusion may include an end sized and shaped to be positioned in the slot defined by the housing. The first protrusions may be positioned on an end of one of the sides and the second protrusions may be positioned on one of the sides in a position proximate the body portion. The second protrusion may be sized and shaped to surround and abut a portion of the slider to prevent the slider from being moved with respect to the housing to a disengaged position.

The retainer may include a planar material bent into a u-shaped configuration. The retainer may be formed of a resilient material to permit the retainer to be engaged with the housing and the slider. The retainer may disable a release mechanism of the slider when engaged with the housing and the slider. The body portion may include at least one dimension corresponding to a dimension of a lateral portion of the slider.

The optoelectronic module may include a handle coupled to the slider. The retainer may be sized and shaped to surround at least a portion of both the handle and the slider in an engaged position.

The slider may be configured to move in a direction parallel to a longitudinal axis of the housing. The protrusion of the slider may be configured to engage a corresponding resilient tab of the cage. The slider may include at least one arm extending along the housing, and the protrusion of the slider may be positioned on the arm.

In another example, a method may include spreading apart sides of a retainer. The sides of the retainer may be coupled to one another by a body portion. The method may include positioning a first protrusion of the retainer in a slot defined by a housing of an optoelectronic module, engaging a second protrusion with a slider of the optoelectronic module. Positioning the first protrusion in the slot and engaging the second with the slider may retain the slider with respect to the housing.

In some embodiments, the method may include positioning the second protrusion in a second slot cooperatively defined between the slider and a handle, the handle coupled to the slider. In other embodiments, the method may include positioning the second protrusion to abut a portion of the slider to prevent the slider from being moved with respect to the housing to a disengaged position.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1A:
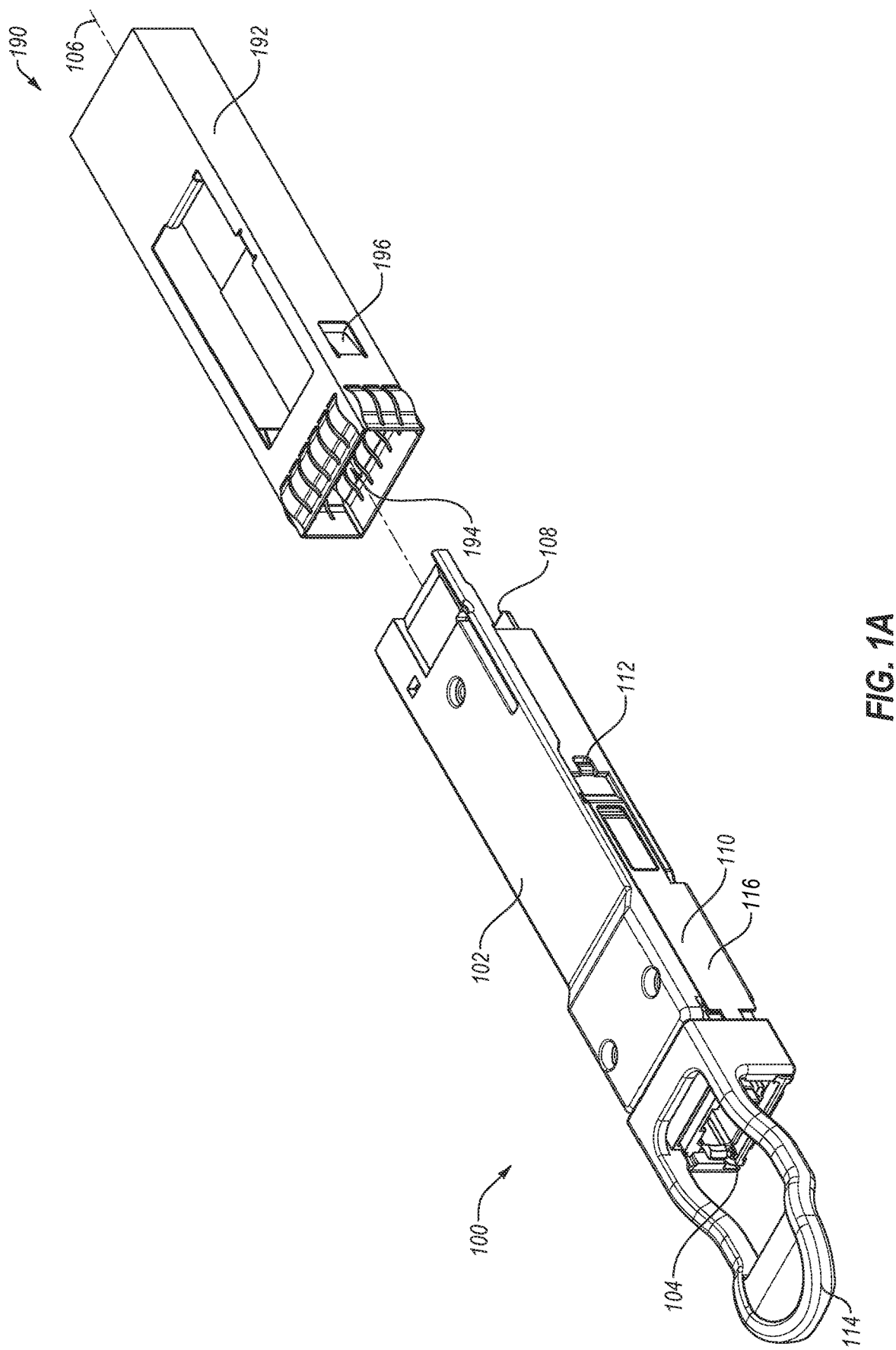
FIG. 1A is a perspective view of an optoelectronic module and a cage.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

The present disclosure generally relates to retainers for optoelectronic modules, which may be implemented to prevent optoelectronic modules from unintentionally disengaging from a host device such as a network switch.

A network switch or other type of host device may be implemented to mechanically retain and communicatively couple multiple optoelectronic modules in a network. The network switch may include multiple ports or cages sized and shaped to receive optoelectronic modules. The optoelectronic modules may convert electrical signals to optical signals, or vice versa, to permit the optoelectronic modules to communicate with other network devices via optical signals. The optoelectronic modules may be communicatively coupled to the network switch, for example, to a printed circuit board assembly (PCBA) of the network switch, to permit the network switch to communicate with the other network devices.

In some configurations, the network switch and the optoelectronic modules may include a coupling mechanism such as a latch to retain the optoelectronic modules in their respective cages in the network switch. This coupling mechanism may also permit the optoelectronic modules to be removed from the cages of the network switch. However, in some circumstances, an optoelectronic module may unintentionally disengage from its cage. Accordingly, the described embodiments include retainers for optoelectronic modules, which may be implemented to prevent optoelectronic modules from unintentionally disengaging from the cages in a network switch.

Typically network switches may be shipped or distributed without optoelectronic modules positioned therein. Such configurations may be implemented, for example, to avoid damage to the optoelectronic modules during transport. However, in some circumstances it may be desirable to distribute network switches populated with optoelectronic modules. In particular, it may be desirable to ship network switches with optoelectronic modules positioned in at least some of the cages of the network switches. However, during movement associated with shipping, the optoelectronic modules may come loose or be shaken out of their respective cages. Furthermore, a release mechanism of an optoelectronic module may be unintentionally activated during shipping.

Optoelectronic modules that unintentionally disengage from their respective cages may result in damage to the optoelectronic modules or the network switch. Accordingly, the disclosed embodiments may include retainers to prevent optoelectronic modules from unintentionally releasing from the cages of the network switch, for example, during shipping. In particular, the disclosed embodiments may deactivate or disable a release mechanism of the optoelectronic module, thereby preventing the optoelectronic module from being removed from the cage of the network switch.

Figure 1B:
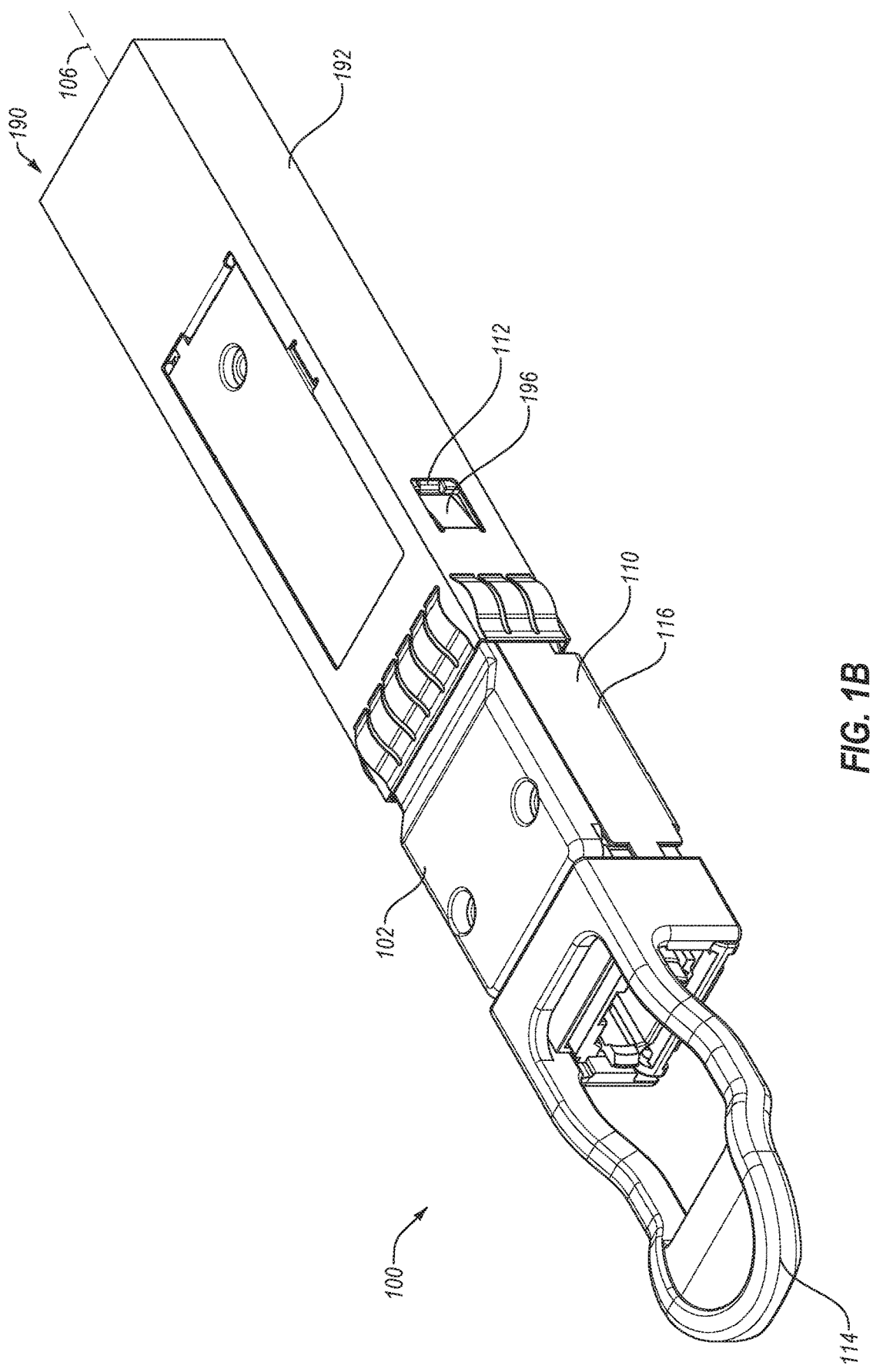
FIG. 1B is a perspective view of the optoelectronic module positioned inside of the cage.

FIGS. 1A-1B illustrate an example of an optoelectronic module 100 and a w corresponding cage 190. In particular, FIG. 1A is a perspective view of the optoelectronic module 100 and the cage 190. As illustrated in FIG. 1A, the optoelectronic module 100 includes a housing 102 which may enclose optical, electrical and optoelectronic components positioned therein. For example, the optoelectronic module 100 may include optoelectronic components such as optical transmitters (e.g. lasers, etc.) and optical receivers (e.g., photodiodes, etc.) to convert electrical signals to optical signals and optical signals to electrical signals. The optoelectronic module 100 may also include corresponding optics such as lenses, collimators, filters, isolators, and the like to direct and modulate optical signals travelling to and from the optoelectronic components. The optoelectronic module 100 may include any suitable electrical components, such as drivers to drive the optical transmitters, amplifiers to amplify signals from the optical receivers, controllers to control the operation of the optoelectronic module 100 and the like. The above-mentioned optoelectronic, optical, and electrical components may be at least partially enclosed in a housing.

As illustrated, the optoelectronic module 100 may include one or more ports 104 to mechanically and optically couple the optoelectronic module 100 to optical fibers. The ports 104 may be sized and shaped to receive a connector of the optical fiber, such as ferrule or other suitable coupler. In the illustrated configuration, the optoelectronic module 100 includes two ports 104, which corresponds to two optical fibers, although any suitable configuration may be implemented. In the illustrated configuration, the optoelectronic module 100 extends along a longitudinal axis 106 and the optical fibers may be inserted into the ports 104 in a direction parallel to the longitudinal axis 106.

When optical fibers are coupled to the optoelectronic module 100, the optoelectronic module 100 may send and receive optical signals with other components in a network. The optoelectronic module 100 may include an electrical coupling 108 such as an edge connector to electrically couple the optoelectronic module 100 to a host device. Accordingly, the optoelectronic module 100 may permit the host device to communicate with other components in the network by converting electrical signals to optical signals to be transmitted to the other components in the network, and converting received optical signals to electricals signals to be used by the host device.

The cage 190 may include a body 192 defining an opening 194 sized and shaped to receive the optoelectronic module 100 (or the housing 102 of the optoelectronic module 100). The cage 190 may be included in a host device to mechanically and electrically couple the optoelectronic module 100. In particular, the cage 190 may receive and retain the optoelectronic module 100 in the opening 194. Furthermore, the host device may include an electrical coupling such as a socket that corresponds to the electrical coupling 108 of the optoelectronic module 100. The socket may receive the edge connector of the optoelectronic module 100 to electrically couple the optoelectronic module 100 to the host device.

Although the illustrated configuration includes one cage 190, the host device may include any suitable number of cages to interface with multiple optoelectronic modules. For example, if the host device is a fiber optic network switch, it may include configurations of 4, 8, 12, 24, 32, 48, 54 ports or any other suitable number of ports and corresponding optoelectronic modules.

The optoelectronic module 100 and the cage 190 may include a coupling mechanism to retain the optoelectronic module 100 with respect to the cage 190. In particular the cage 109 may include resilient tabs 196 and the optoelectronic module 100 may include a slider 116 with arms 110 configured to engage with the tabs 196 of the cage 190 to prevent removal of the optoelectronic module 100 from the cage 190. In particular, the arms 110 may include protrusions 112 that engage the tabs 196 of the cage 190 thereby preventing movement of the optoelectronic module 100, for example, in a direction parallel to the longitudinal axis 106. The slider 116 and the arms 110 may move with respect to the housing 102 of the optoelectronic module 100, in a direction parallel to the longitudinal axis 106, to engage or disengage the protrusions 112 with respect to the tabs 196. As shown, the arms 110 extend along the housing 102 in a direction parallel to the longitudinal axis 106.

The optoelectronic module 100 may include a handle 114 coupled to the slider 116 to permit a user to move the slider 116 in a direction parallel to the longitudinal axis 106 to engage or disengage the optoelectronic module 100 with respect to the cage 190. In the illustrated configuration, the handle 114 extends in a direction parallel to the longitudinal axis 106 and is sized and shaped to be grasped or otherwise manipulated by the user.

FIG. 1B is a perspective view of the optoelectronic module 100 positioned inside of the cage 190. The optoelectronic module 100 may be inserted in the opening 194 and slid into the cage 190 until the housing 102 abuts the cage 190. Once the optoelectronic module 100 is positioned in the cage 190, the protrusions 112 may engage the tabs 196 to prevent the optoelectronic module 100 from being removed from the cage 190, as shown. Since the tabs 196 are resilient, they may be displaced by the protrusions 112 as the optoelectronic module 100 is inserted into the cage 190, until the protrusions 112 move beyond and abut the ends of the tabs 196, in the engaged position shown.

Figure 1C:
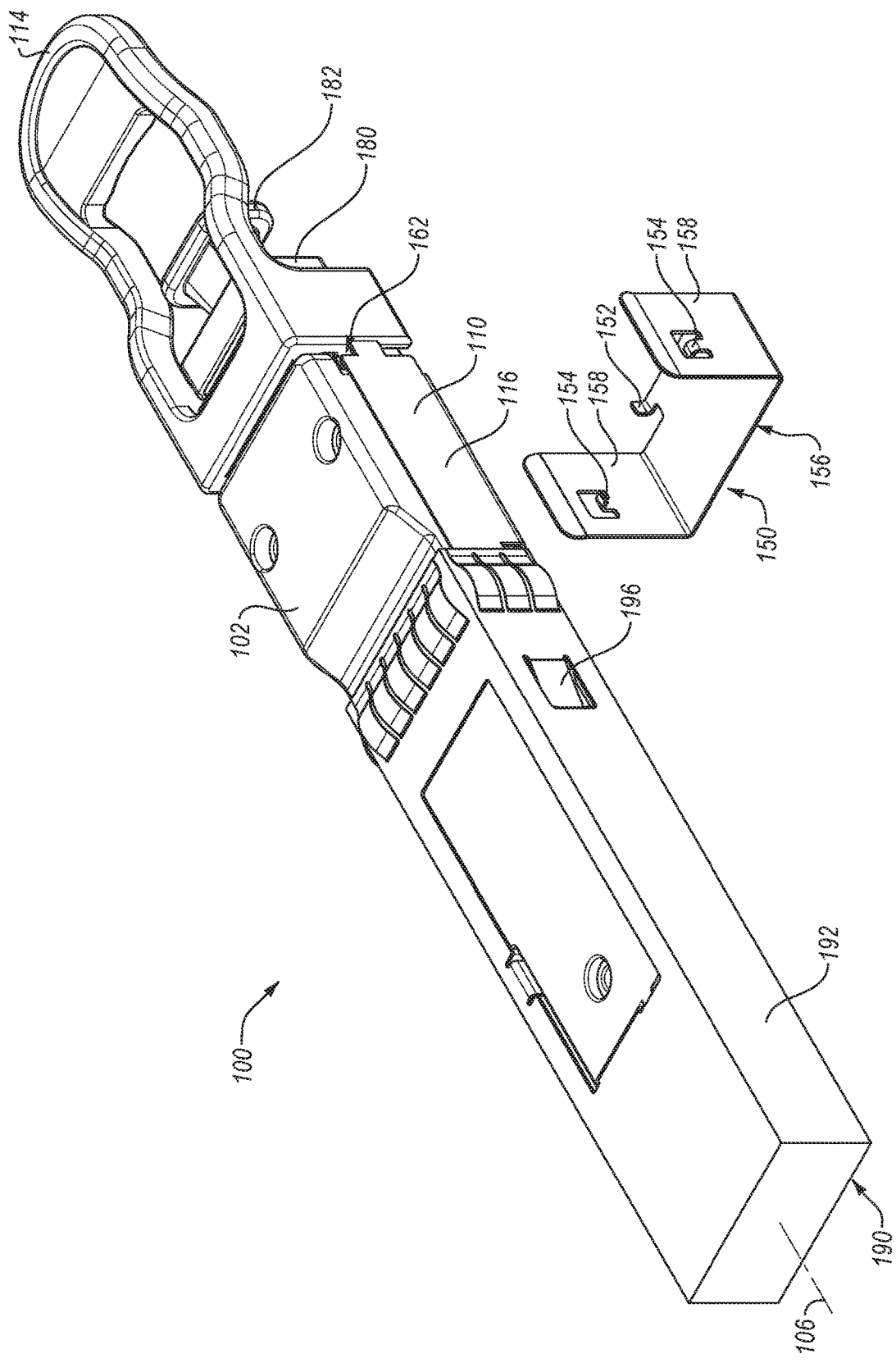
FIGS. 1C and 1D are perspective views of the optoelectronic module positioned inside of the cage with a retainer.
Figure 1D:
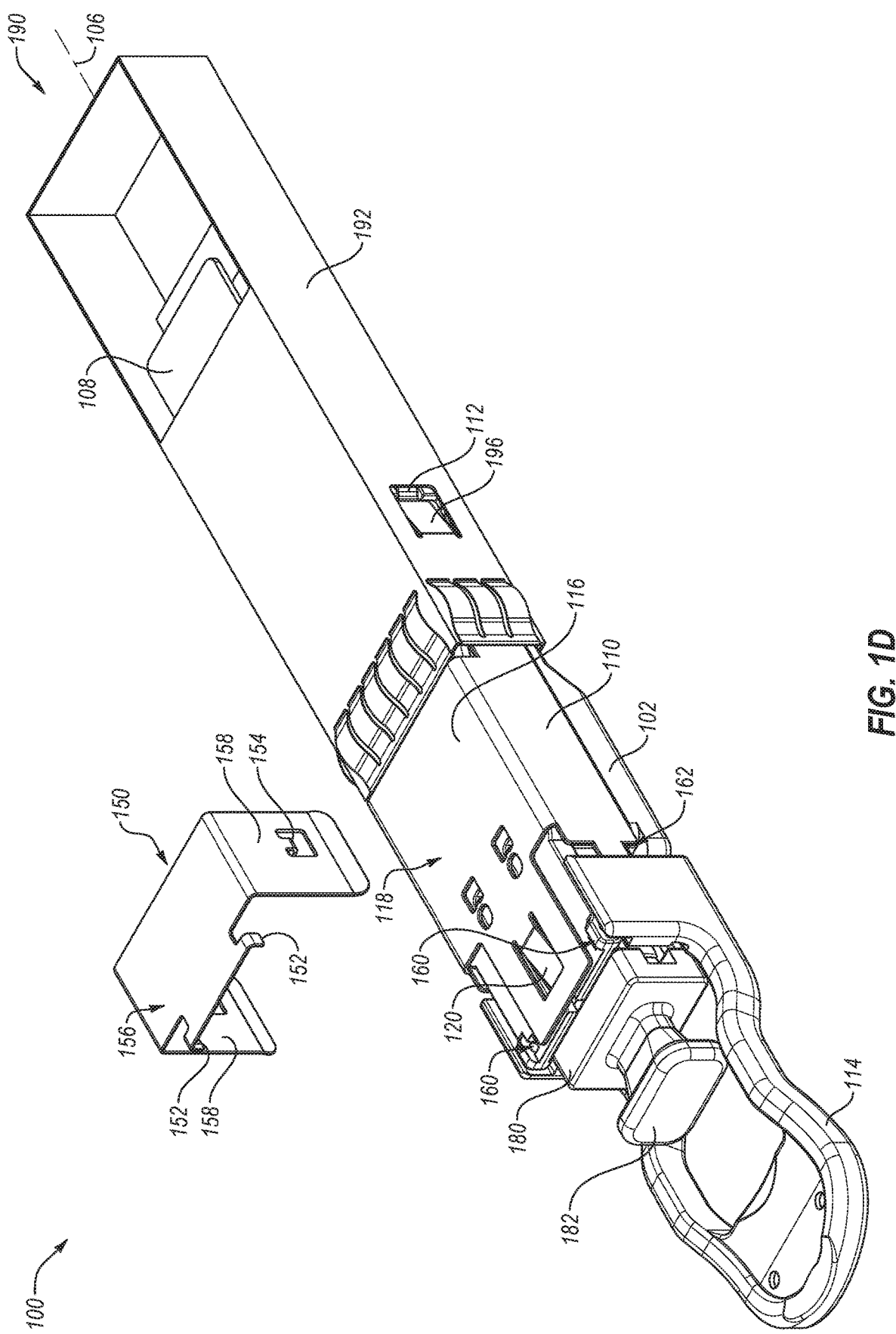

FIGS. 1C-1D are perspective views of the optoelectronic module 100 positioned inside of the cage 190. In addition, FIGS. 1C-1D illustrate a retainer 150 and a plug 180. The retainer 150 may be implemented to prevent the optoelectronic module 100 from unintentionally disengaging from the cage 190. The plug 180 may be sized and shaped to be positioned in the ports 104. The plug 180 may occlude the ports 104 to prevent contaminants such as dust and material from entering the ports 104, for example, during transport, shipping or otherwise when the optoelectronic module 100 is not in use and is not coupled to optical fibers. Thus, the retainer 150 and the plug 180 may avoid damage to the optoelectronic module 100 during transport. The plug 180 may include a handle 182 sized and shaped for a user to manipulate the plug 180. For example, the handle 182 may be sized and shaped to be grasped the user to displace the plug 180. The user may grasp the handle 182 to insert the plug 180 into the ports 104 and/or to remove the plug 180 from the ports 104.

As shown in FIG. 1D, the slider 116 includes a resilient tab 120 that generally extends towards a direction parallel to the longitudinal axis 106 and is biased towards the housing 102 of the optoelectronic module 100. The resilient tab 120 may be positioned on a lateral portion 118 of the slider 116, which extends between and is coupled to the arms 110. While the arms 110 extend along two opposite facing sides of the optoelectronic module 100, the lateral portion 118 may extend perpendicular to the arms 110, as shown. In the illustrated configuration, the lateral portion 118 and the arms 110 are integral with the slider 116, and form a u-shaped slider member (e.g., having a u-shaped cross-section). In such circumstances, the slider member may include two arm portions (e.g., arms 110) and the lateral portion 118 extending therebetween. However, other suitable configurations may be implemented.

As will be described in further detail below, the retainer 150 may be configured to deactivate or disable a release mechanism of the optoelectronic module 100, thereby preventing the optoelectronic module 100 from unintentionally releasing from the cage 190. Such configuration may permit network switches to be shipped with optoelectronic modules positioned in the cages, without the optoelectronic modules coming loose of their respective cages. Accordingly, the retainer 150 may prevent damage to the optoelectronic module 100 or the network switch during shipping.

As explained above, the slider 116 may move with respect to the housing 102 of the optoelectronic module 100 in a direction parallel to the longitudinal axis 106 to engage or disengage the protrusions 112 with respect to the tabs 196. Furthermore, the handle 114 is coupled to the slider 116 to permit a user to move the slider 116 in a direction parallel to the longitudinal axis 106 to engage or disengage the optoelectronic module 100 with respect to the cage 190. In the position shown in FIGS. 1C-1D, the slider 116 is in an engaged or locked position, with the slider 116 positioned towards the electrical coupling 108 along the longitudinal axis 106. In this position, the handle 114 is also positioned towards the electrical coupling 108, with the handle 114 abutting the housing 102, for example, as shown in FIG. 1B.

In a disengaged or unlocked position, the slider 116 may be positioned further from the electrical coupling 108 along the longitudinal axis 106. In this position, the protrusions 112 of the slider 116 may disengage the tabs 196 of the cage 190 to permit the optoelectronic module 100 to be removed from the cage 190. In particular, the protrusions 112 may displace the tabs 196 in a direction away from the optoelectronic module 100, permitting the slider 116 and the protrusions 112 to move past the tabs 196, for example, to permit the optoelectronic module 100 to be removed from the cage 190. A user may move the slider 116 to the disengaged or unlocked position by pulling on the handle 114, which is coupled to the slider 116. Thus, when a user pulls on the handle 114, the slider 116 may be moved to the disengaged or unlocked position, thereby permitting the protrusions 112 of the slider 116 to move past the tabs 196.

The slider 116 may not move beyond the disengaged or unlocked position, so when the user continues to pull on the handle 114, the entire optoelectronic module 100 will be pulled along with the handle 114, thereby pulling the optoelectronic module 100 from the cage 190. In practice, when the user pulls on the handle 114 the optoelectronic module 100 may be removed from the cage 190 in a continuous motion, with the slider 116 first being pulled into the disengaged or unlocked position and then the optoelectronic module 100 being pulled from the cage 190.

The retainer 150 may be configured to prevent the slider 116 (and the handle 114) from being moved with respect to the housing 102 or the rest of the optoelectronic module 100 (e.g., in the longitudinal direction) to the disengaged or unlocked position. This in turn prevents the optoelectronic module 100 from being removed from the cage, and from unintentional release from the cage 190.

As will be described in further detail below, the retainer 150 may include first protrusions 152 to engage with the housing 102 of the optoelectronic module 100 and second protrusions 154 to engage with the handle 114 and/or the slider 116 of the optoelectronic module 100, to prevent the slider 116 from moving with respect to the housing 102 in a direction parallel to the longitudinal axis 106 to the disengaged or unlocked position (e.g., in a direction away from the electrical coupling 108).

As shown, the retainer 150 may be formed of or may include a sheet of generally planar material bent into a u-shaped configuration to retain the slider 116 with respect to the housing 102. The retainer 150 may include a body portion 156 extending between two oppositely positioned sides 158 of the retainer 150. In the illustrated configuration, the body portion 156 is generally planar and the sides 158 extend transverse or perpendicular to the body portion 156 and are also planar. The body portion 156 may be sized and shaped to generally corresponding to the lateral portion 118 of the slider 116 and a portion of the handle 114. In particular, the body portion 156 may include at least one dimension that is substantially the same as a corresponding dimension of the lateral portion 118 of the slider 116.

The protrusions 152 may be positioned on the body portion 156 and may extend transverse or perpendicular to the body portion 156, in a direction towards the interior of the retainer 150 (e.g., generally towards the center of the "u" defined by the retainer 150). The protrusions 154 may be positioned on the sides 158 of the retainer 150 and may extend transverse or perpendicular to the sides 158 (e.g., in a direction parallel to the body portion 156). The protrusions 154 may also extend in a direction towards the interior of the retainer 150 (e.g., generally towards the center of the "u" defined by the retainer 150). As shown, in some configuration the protrusions 154 may be positioned within or may be surrounded by an opening defined in the sides 158 of the retainer 150, although other configurations may be implemented. The protrusions 152 may be offset with respect to the protrusions 154 in a lateral or vertical direction, that is, the protrusions 152 may not be aligned with respect to the protrusions 154 in a lateral or vertical direction, or both.

The housing 102 may define slots 160 sized and shaped to receive the protrusions 152. In the illustrated configuration, the housing 102 includes two slots 160 to correspond to the two protrusions 152, although any suitable number of slots and corresponding protrusions may be implemented. The slots 160 may be spaced apart from one another a distance that corresponds to the spacing between the protrusions 152, or vice versa. The optoelectronic module 100 may include slots 162 sized and shaped to receive the protrusions 154. In the illustrated configuration, the slots 162 are cooperatively defined by the handle 114 and the slider 116 (e.g., the arms 110 of the slider 116), and thus the slots 162 are positioned between the handle 114 and the slider 116. Thus, the handle 114 and the slider 116 bound the slots 162 on opposite sides. However, in other configurations the slots 162 may be defined in the handle 114, the slider 116, or other suitable portions of the optoelectronic module 100. As shown, the optoelectronic module 100 includes two slots 162 to correspond to the two protrusions 154, although any suitable number of slots and corresponding protrusions may be implemented. The slots 162 may be spaced apart from one another a distance that corresponds to the spacing between the arms 110 of the slider 116, although other configurations may be implemented.

The retainer 150 may be formed of a resilient material (such as a resilient metal material) to permit the retainer 150 to engage and disengage the optoelectronic module 100. In particular, the retainer 150 may be bent or otherwise manipulated to permit the retainer 150 to be positioned around the slider 116, a portion of the handle 114 and a portion of the housing 102. Once positioned to engage the optoelectronic module 100, the retainer 150 may return to its original shape as it retains the slider 116 in the engaged or locked position with respect to the housing 102, with the protrusions 152, 154 engaged with the optoelectronic module 100.

Figure 1E:
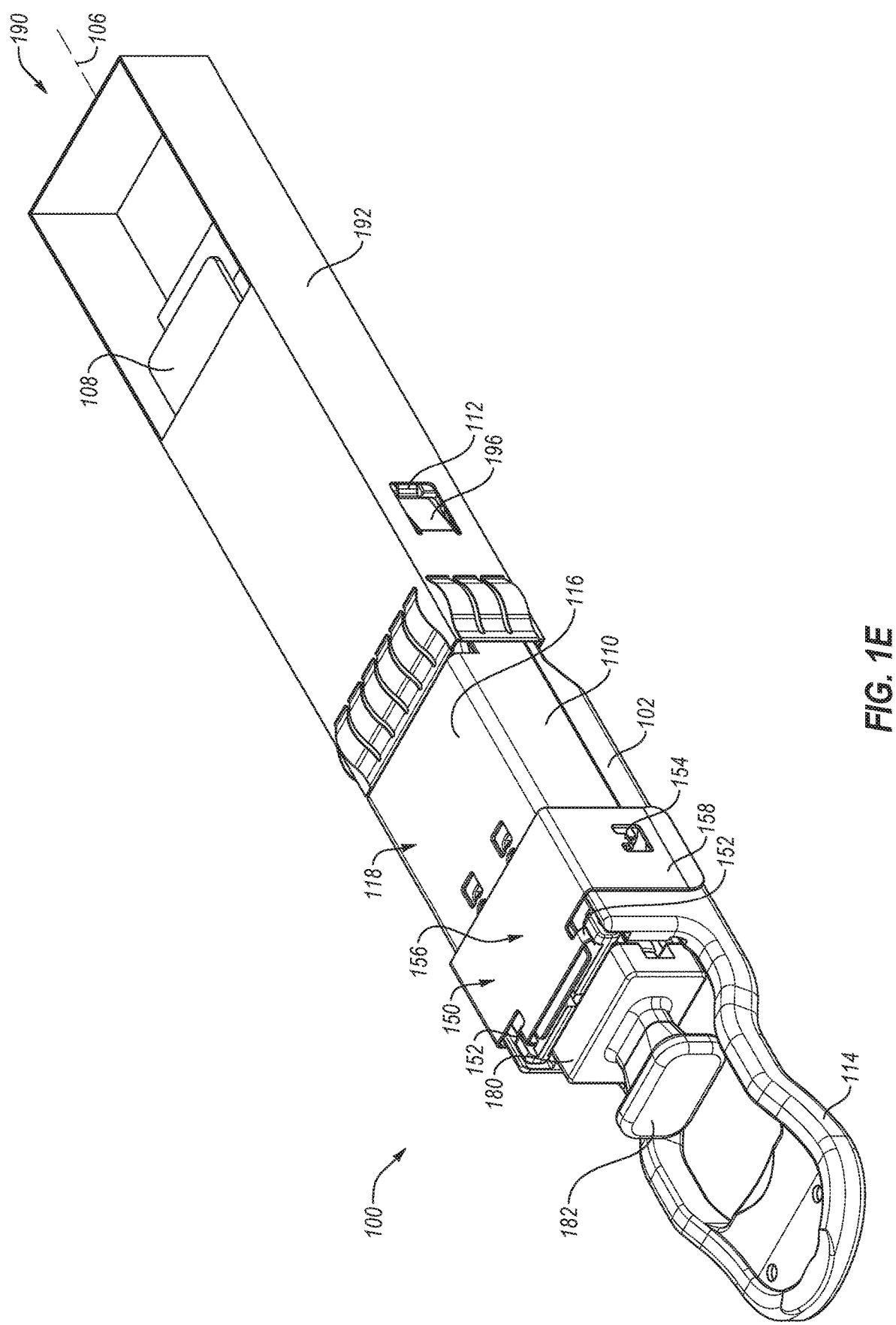
FIG. 1E is a perspective view of the retainer engaged with the optoelectronic module.

FIG. 1E is another perspective view of the optoelectronic module 100 with the retainer 150 engaged with the optoelectronic module 100. In the illustrated configuration, the retainer 150 surrounds a portion of the slider 116, a portion of the handle 114 and a portion of the housing 102 to retain the slider 116 in a fixed position (e.g., the engaged or locked position) with respect to the housing 102. The protrusions 152 are positioned in the slots 160 defined by the housing 102 and the protrusions 154 are positioned in the slots 162 defined between the handle 114 and the slider 116.

The retainer 150 may be engaged with the housing 102 to prevent the handle 114 and the slider 116 from moving with respect to the housing 102 in a direction parallel to the longitudinal axis 106 to the disengaged or unlocked position (e.g., in a direction away from the electrical coupling 108).

As shown in FIG. 1E, the body portion 156 may cover part of the lateral portion 118 and/or the resilient tab 120 of the slider 116. The sides 158 of the retainer 150 may be positioned to surround the optoelectronic module 100 and may extend generally parallel to the sides of the optoelectronic module 100 (e.g., sides of the housing 102 and the arms 110 of the slider 116). The retainer 150 may include rounded corners that generally correspond to the curvature of the slider 116 and/or the housing 102.

When the protrusions 152 are positioned in the slots 160 of the housing 102, the protrusions 152 abut the housing to retain the retainer 150 with respect to the housing 102 (e.g., to prevent the retainer 150 from moving with respect to the housing 102, and vice versa). Further, when the protrusions 154 are positioned in the slots 162, the protrusions 154 abut the slider 116 (and the handle 114) to retain the retainer 150 with respect to the slider 116 (e.g., to prevent the retainer 150 from moving with respect to the slider 116, and vice versa). Accordingly, when the retainer 150 is engaged with the housing 102 and the slider 116 (by the protrusions 152, 154), the slider 116 is retained with respect to the housing 102, thereby fixing the slider 116 with respect to the housing 102. Additionally or alternatively, when the retainer 150 is engaged with the housing 102 and the handle 114 (by the protrusions 152, 154), the handle 114 is retained with respect to the housing 102, thereby fixing the handle 114 with respect to the housing 102.

As mentioned above, the retainer 150 may be formed of a resilient material (such as a resilient metal material) to permit the retainer 150 to engage and disengage the optoelectronic module 100. To engage the retainer 150 with the optoelectronic module 100, the sides 158 may be spread apart, for example, by a user pulling the sides 158 apart. Spreading the sides 158 apart may permit the protrusions 154 to clear the sides of the optoelectronic module 100 without interference. The retainer 150 may then be positioned around the optoelectronic module 100, for example, in the engaged position shown in FIG. 1E. In the engaged position, the protrusions 152 are positioned in the slots 160 and the protrusions 154 are positioned in the slots 162. Once positioned to engage the optoelectronic module 100, the retainer 150 may return to its original shape, by virtue of the resilience of the retainer 150, to retain the slider 116 and the handle 114 with respect to the housing 102 (e.g., with the protrusions 154 positioned in the slots 162). In this position (e.g., the engaged position), the sides 158 of the retainer 150 may abut the arms 110 of the slider 116 and/or a portion of the handle 114.

To disengage or unlock the retainer 150 with respect to the optoelectronic module 100, the sides 158 may be spread apart (for example, by a user pulling the sides 158 apart), which in turn may remove the protrusions 154 from the slots 162, and may also permit the protrusions 154 to clear the sides of the optoelectronic module 100 without interference. The retainer 150 may then be removed from contacting the optoelectronic module 100, and the protrusions 152 may be removed from the slots 160. With the retainer 150 removed, the handle 114 and the slider 116 may be actuated to remove the optoelectronic module 100 from the cage 190.

Figure 2A:
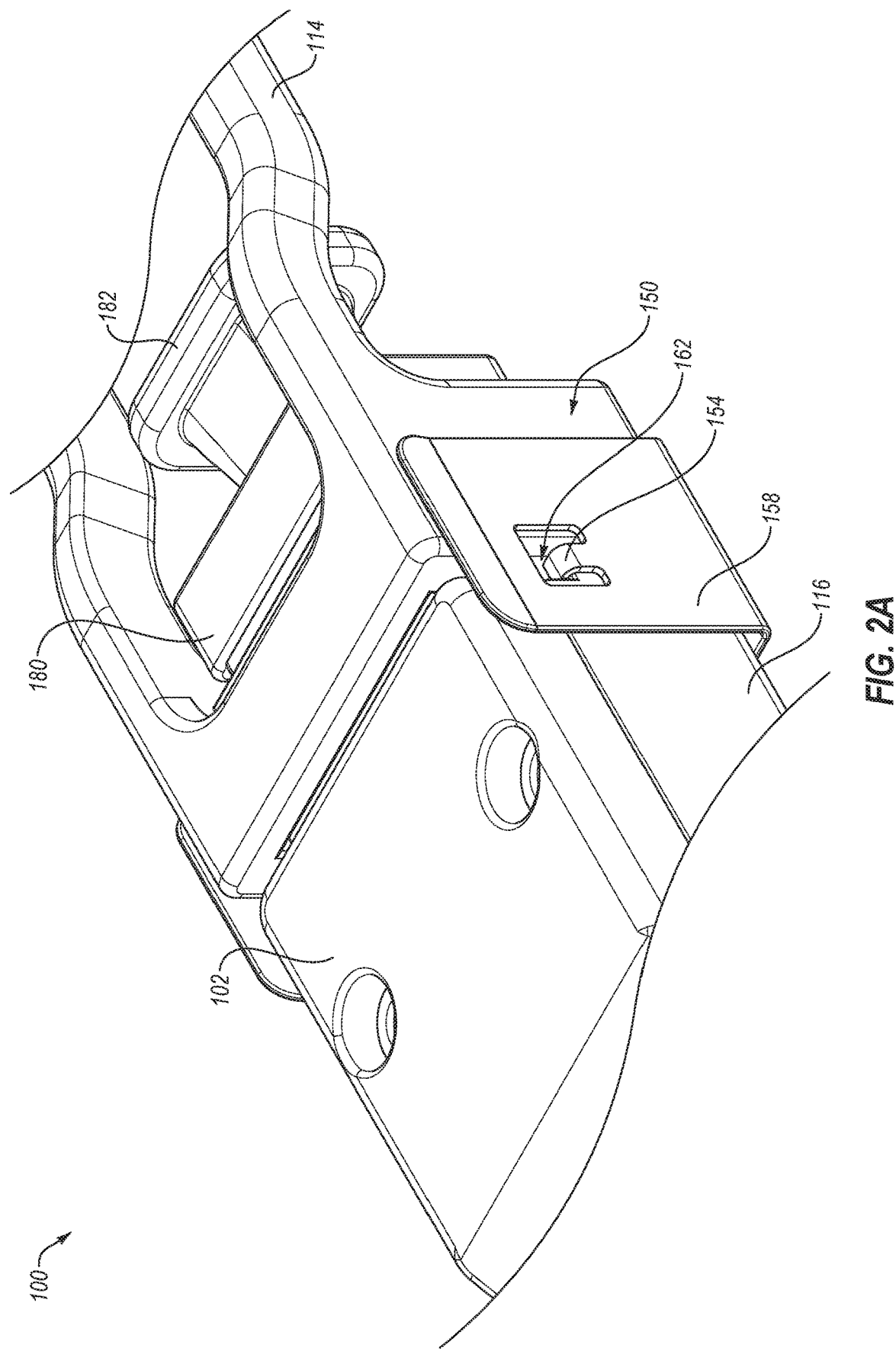
FIGS. 2A-2B are perspective views of the retainer and a portion of the optoelectronic module.
Figure 2B:
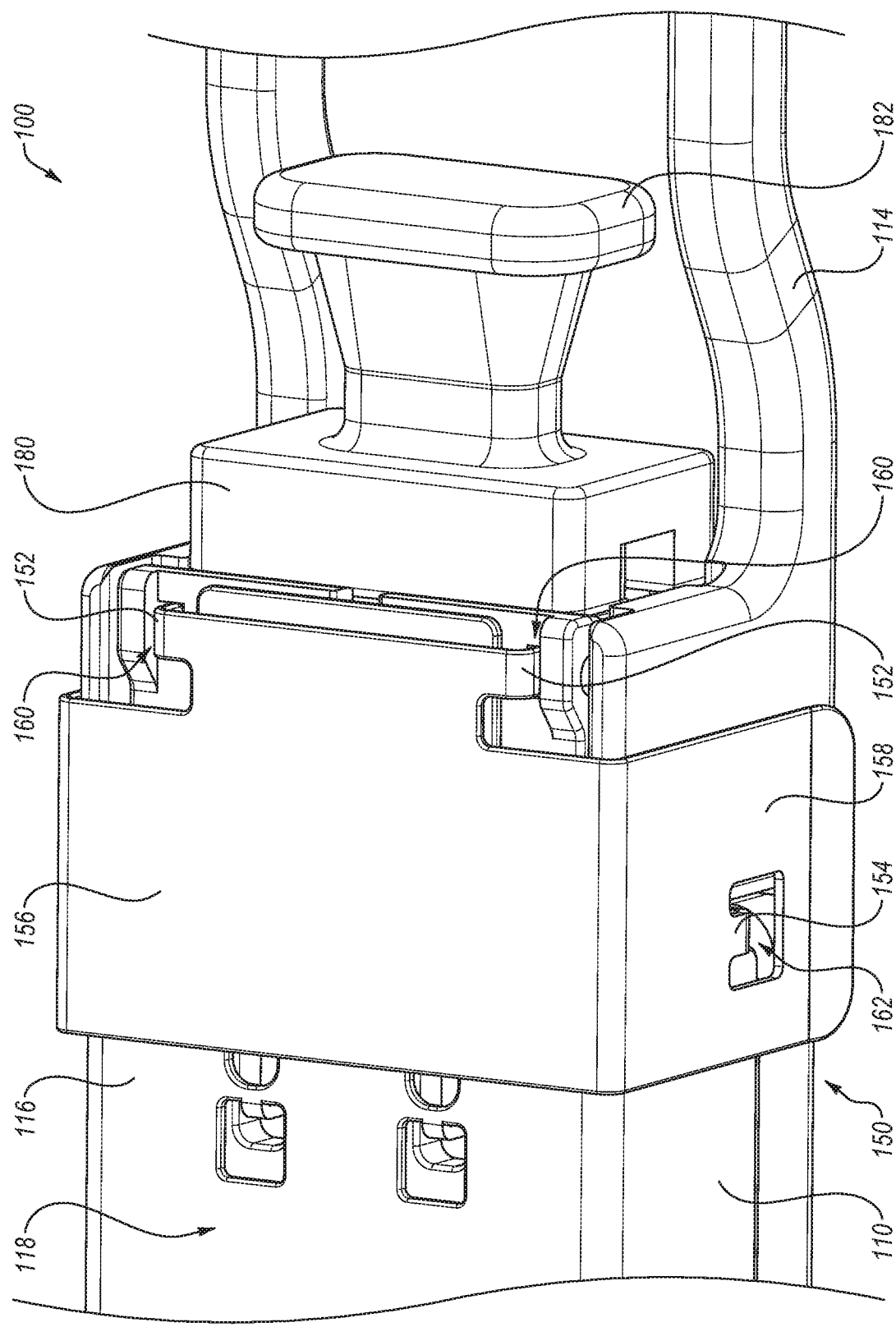

FIGS. 2A-2B are perspective views of a portion of the optoelectronic module 100 and the retainer 150. In particular, FIGS. 2A-2B are perspective views of the retainer 150 engaged with the optoelectronic module 100.

As shown in FIG. 2A, the protrusions 154 are positioned in the slots 162 defined between the slider 116 and the handle 114. In this position (e.g., the engaged position), the protrusions 154 are engaged with and abut the slider 116. This may in turn prevent the slider 116 from moving with respect to the housing 102, as will be described in further detail below.

As shown in FIG. 2B, the protrusions 152 are positioned in the slots 160 defined by the housing 102. In this position (e.g., the engaged position), the protrusions 152 are engaged with and abut the housing 102. This may in turn prevent the retainer 150 from moving with respect to the housing 102.

Thus, in the engaged position, the retainer 150 is fixed with respect to both the housing 102 and the slider 116. Since the handle 114 is coupled to the slider 116, the retainer 150 also retains the handle 114 with respect to the housing 102. This in turn prevents the slider 116 from moving with respect to the housing 102 to deactivate or disable the release mechanism of the slider 116, thereby preventing release of the optoelectronic module 100 from the cage 190. Additionally or alternatively, since the retainer 150 is fixed with respect to both the housing 102 and the slider 116, this prevents the slider 116 from moving with respect to the housing 102 in a direction parallel to the longitudinal axis 106 to the disengaged or unlocked position.

Although FIGS. 2A-2B illustrate only a portion of the retainer 150 and the optoelectronic module 100 (e.g., one side), and thus only one of the protrusion 154 and corresponding slots 162 are shown, it should be appreciated that the engaging and disengaging movement described may apply to the other side of the retainer 150 and the optoelectronic module 100.

Figure 2C:
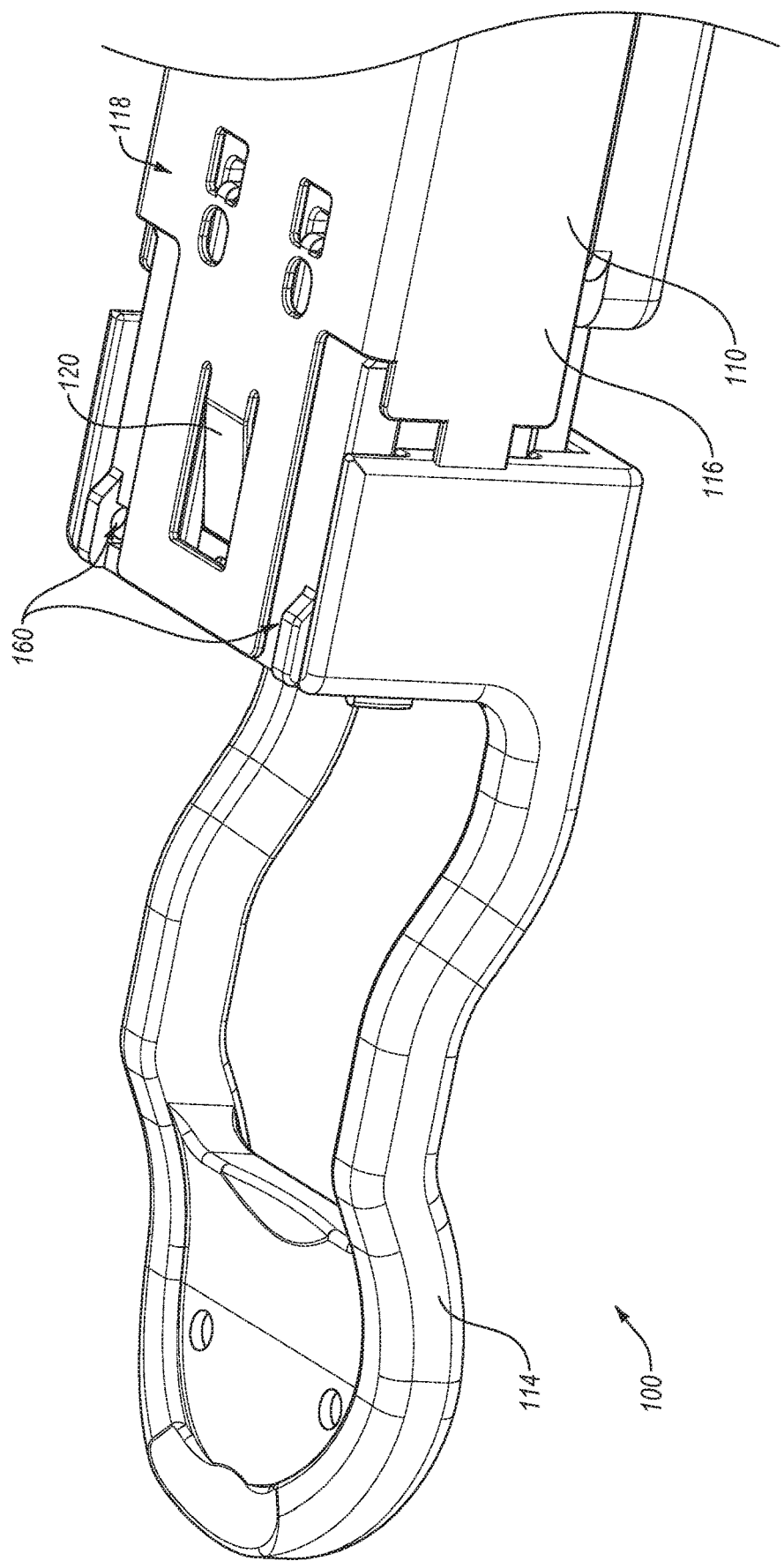
FIG. 2C is a perspective view a portion of the optoelectronic module in a disengaged position.

FIG. 2C illustrates a perspective view of the optoelectronic module 100 with the retainer 150 removed, with the optoelectronic module 100 in a disengaged or unlocked position. When the retainer 150 is not engaged with the optoelectronic module 100 (e.g., by restricting movement of the slider 116), the slider 116 may move with respect to the housing 102 to the w disengaged or unlocked position shown. For example, a user may move the slider 116 to the disengaged or unlocked position by pulling on the handle 114, which is coupled to the slider 116.

In the disengaged or unlocked position, the slider 116 may be positioned further along the longitudinal axis 106 away from the cage 190, as shown. In this position, the protrusions 112 of the slider 116 may disengage the tabs 196 of the cage 190 to permit the optoelectronic module 100 to be removed from the cage 190. Furthermore, the slider 116 may not move beyond the disengaged or unlocked position shown, so when the user continues to pull on the handle 114, the entire optoelectronic module 100 will be pulled along with the handle 114, thereby removing the optoelectronic module 100 from the cage 190.

As explained above, the disclosed configurations of the retainer 150 may deactivate or disable the release mechanism of the optoelectronic module 100, to prevent the optoelectronic module 100 from unintentionally releasing from the cage 190, for example, during shipping or transport. In particular, the retainer 150 may be implemented to deactivate or disable the slider 116 release mechanism, thereby preventing the optoelectronic module 100 from being removed from the cage 190, which may be implemented in a network switch.

In one example, a method of engaging the retainer 150 with the optoelectronic module 100 may include spreading the sides 158 of the retainer 150, for example, by a user pulling the sides 158 apart. Spreading the sides 158 apart may permit the protrusions 154 to clear the sides of the optoelectronic module 100 without interference. The method may include positioning the retainer 150 around the optoelectronic module 100, for example, in the engaged position shown in FIG. 1E. In the engaged position, the protrusions 152 are positioned in the slots 160 and the protrusions 154 are positioned in the slots 162. Once positioned to engage the optoelectronic module 100, the retainer 150 may return to its original shape, by virtue of the resilience of the retainer 150, to retain the slider 116 and the handle 114 with respect to the housing 102 (e.g., with the protrusions 154 positioned in the slots 162). In this position (e.g., the engaged position), the sides 158 of the retainer 150 may abut the arms 110 of the slider 116 and/or a portion of the handle 114.

In some aspects, the method of engaging the retainer 150 with the housing 102 may include abutting the protrusion 152 of the retainer 150 against the housing 102 in the slot 160, and abutting the protrusion 154 of the retainer 150 against the slider 116 (or the handle 114). To deactivate or disable the slider 116 release mechanism, the retainer 150 engages the slider 116 and the housing 102 to prevent the slider 116 from moving to the disengaged or unlocked position. Since the retainer 150 abuts the slider 116 and is also secured to the housing 102 by the protrusions 152, the slider 116 is prevented from moving to the disengaged or unlocked position until the retainer 150 is removed.

In another example, a method of disengaging the retainer 150 with the optoelectronic module 100 may include spreading apart the sides 158 of the retainer 150 (for example, by a user pulling the sides 158 apart). The sides 158 may be coupled to one another by the body portion 156. The method may include removing the protrusions 154 from the slots 162 (e.g., by pulling the sides 158 apart), which may in turn permit the protrusions 154 to clear the sides of the optoelectronic module 100 without interference. The method may include removing the retainer 150 from contacting the optoelectronic module 100. The method may include removing the protrusions 152 from the slots 160. In some configurations, removing the protrusions 152 from the slots 160 may occur after removing the protrusions 154 from the slots 162. With the retainer 150 removed, the handle 114 and the slider 116 may be actuated to remove the optoelectronic module 100 from the cage 190.

In some configurations, the protrusions 152 and the protrusions 154 may be integral with respect to the body of the retainer 150. That is, retainer 150 including the protrusions 152 and the protrusions 154 may be formed of a single piece of material. Additionally or alternatively, the sides 158 and the body portion 156 may be integral with respect to the body of the retainer 150. That is, retainer 150 including the sides 158 and the body portion 156 may be formed of a single piece of material.

In the illustrated configuration, two of the protrusions 152, 154 are included, with one on each side of the retainer 150. However, the retainer 150 may include any suitable number of the protrusions 152, 154. For example, the retainer 150 may include one protrusion, or more than two protrusions. Further, other suitable features besides protrusions may be implemented to engage with the housing 102.

FIGS. 3A-3E illustrate another example of an optoelectronic module 200 and a corresponding cage 290. The optoelectronic module 200 and the cage 290 may include any suitable aspects described above, and some similar features described above will not be repeated for brevity.

Figure 3A:
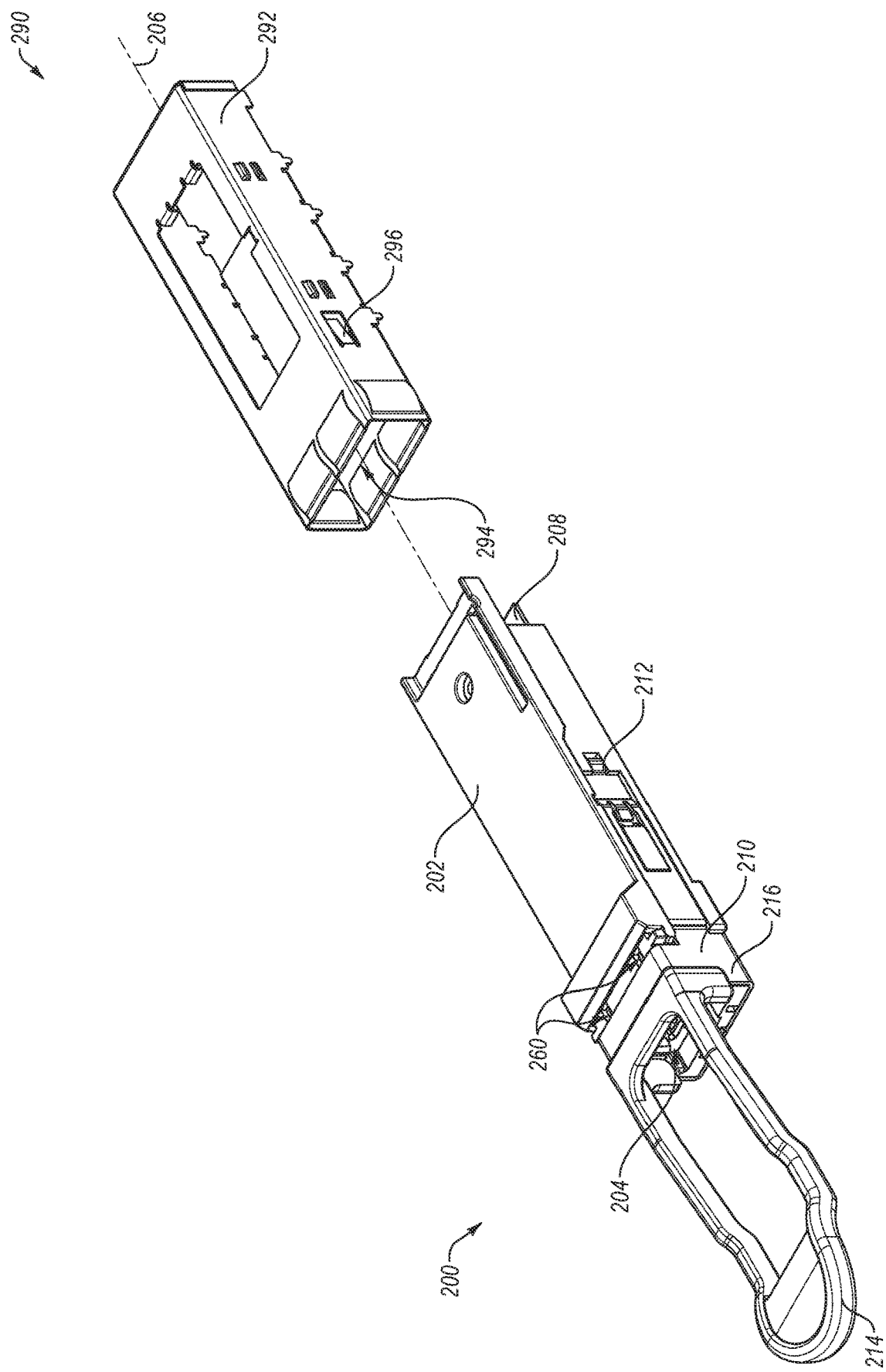
FIG. 3A is a perspective view of an optoelectronic module and a cage.

FIG. 3A is a perspective view of the optoelectronic module 200 and the cage 290. As illustrated in FIG. 3A, the optoelectronic module 200 includes a housing 202 which may enclose optical, electrical and optoelectronic components positioned therein. For example, the optoelectronic module 200 may include optoelectronic components such optical transmitters (e.g. lasers, etc.) and optical receivers (e.g., photodiodes, etc.) to convert electrical signals to optical signals and optical signals to electrical signals. The optoelectronic module 200 may also include corresponding optics such as lenses, collimators, filters, isolators, and the like to direct and modulate optical signals travelling to and from the optoelectronic components. The optoelectronic module 200 may include any suitable electrical components, such as drivers to drive the optical transmitters, amplifiers to amplify signals from the optical receivers, controllers to control the operation of the optoelectronic module 200 and the like. The above-mentioned optoelectronic, optical, and electrical components may be at least partially enclosed in a housing.

As illustrated, the optoelectronic module 200 may include one or more ports 204 to mechanically and optically couple the optoelectronic module 100 to optical fibers. The ports 204 may be sized and shaped to receive a connector of the optical fiber, such as ferrule or other suitable coupler. When optical fibers are coupled to the optoelectronic module 200, the optoelectronic module 200 may send and receive optical signals with other components in a network. The optoelectronic module 200 may include an electrical coupling 208 such as an edge connector to electrically couple the optoelectronic module 200 to a host device. Accordingly, the optoelectronic module 200 may permit the host device to communicate with other components in the network by converting electrical signals to optical signals to be transmitted to the other components in the network, and converting received optical signals to electricals signals to be used by the host device.

The cage 290 may include a body 292 defining an opening 294 sized and shaped to receive the optoelectronic module 200 (or the housing 202 of the optoelectronic module 200). The cage 290 may be included in a host device to mechanically and electrically couple the optoelectronic module 200. In particular, the cage 290 may receive and retain the optoelectronic module 200 in the opening 294. Furthermore, the host device may include an electrical coupling such as a socket that corresponds to the electrical coupling 208 of the optoelectronic module 200. The socket may receive the edge connector of the optoelectronic module 200 to electrically couple the optoelectronic module 200 to the host device.

The optoelectronic module 200 and the cage 290 may include a coupling mechanism to retain the optoelectronic module 200 with respect to the cage 290. In particular the cage 209 may include resilient tabs 296 and the optoelectronic module 200 may include a slider 216 with arms 210 configured to engage with the tabs 296 of the cage 290 to prevent removal of the optoelectronic module 200 from the cage 290. In particular, the arms 210 may include protrusions 212 that engage the tabs 296 of the cage 290 thereby preventing movement of the optoelectronic module 200, for example, in a direction parallel to the longitudinal axis 206. The slider 216 and the arms 210 may move with respect to the housing 202 of the optoelectronic module 200, in a direction parallel to the longitudinal axis 206, to engage or disengage the protrusions 212 with respect to the tabs 296. As shown, the arms 210 extend along the housing 202 in a direction parallel to the longitudinal axis 206.

The optoelectronic module 200 may include a handle 214 coupled to the slider 216 to permit a user to move the slider 216 in a direction parallel to the longitudinal axis 206 to engage or disengage the optoelectronic module 200 with respect to the cage 290. In the illustrated configuration, the handle 214 extends in a direction parallel to the longitudinal axis 206 and is sized and shaped to be grasped or otherwise manipulated by the user.

Figure 3B:
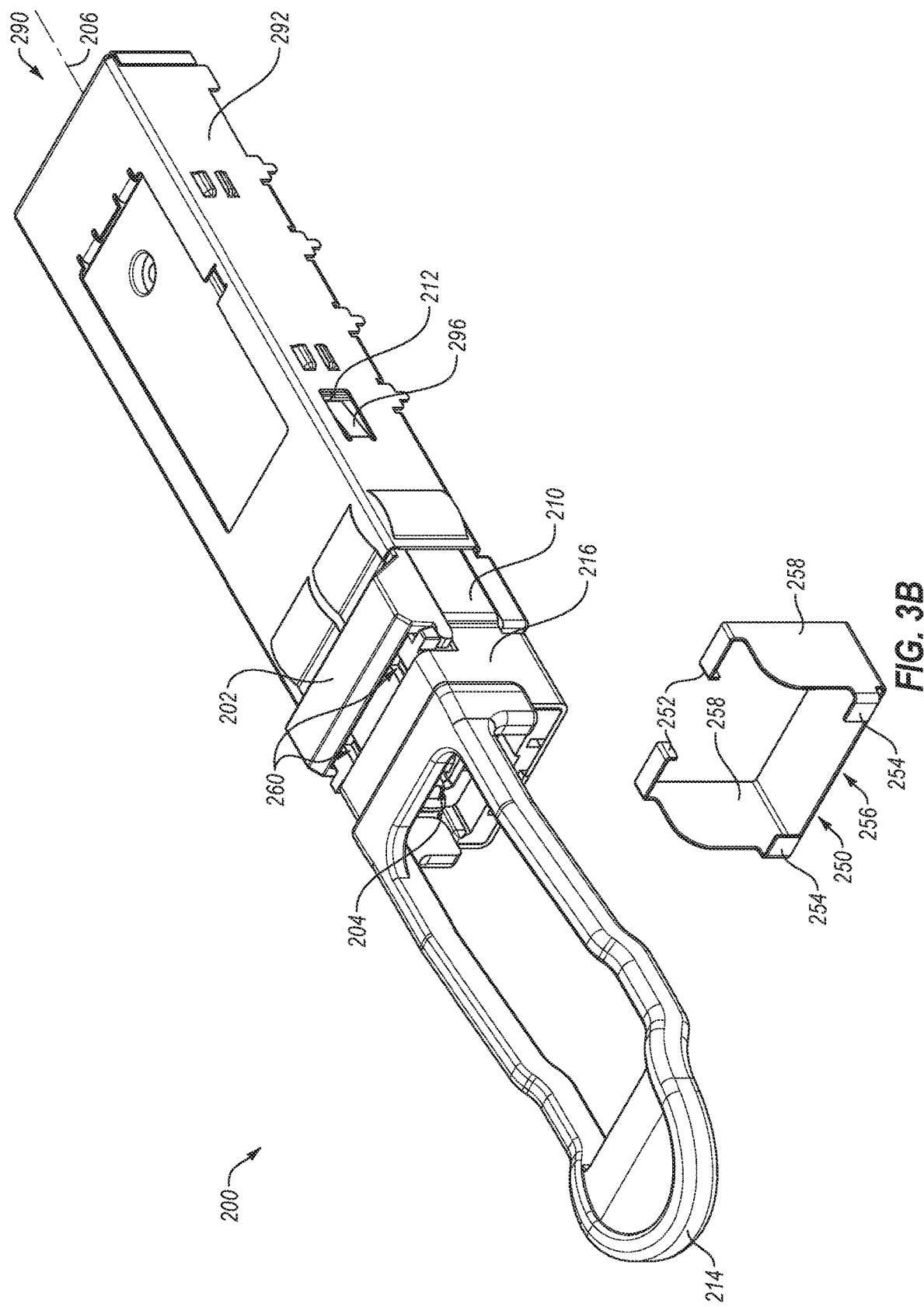
FIGS. 3B-3C are perspective views of the optoelectronic module positioned inside of the cage with a retainer.
Figure 3C:
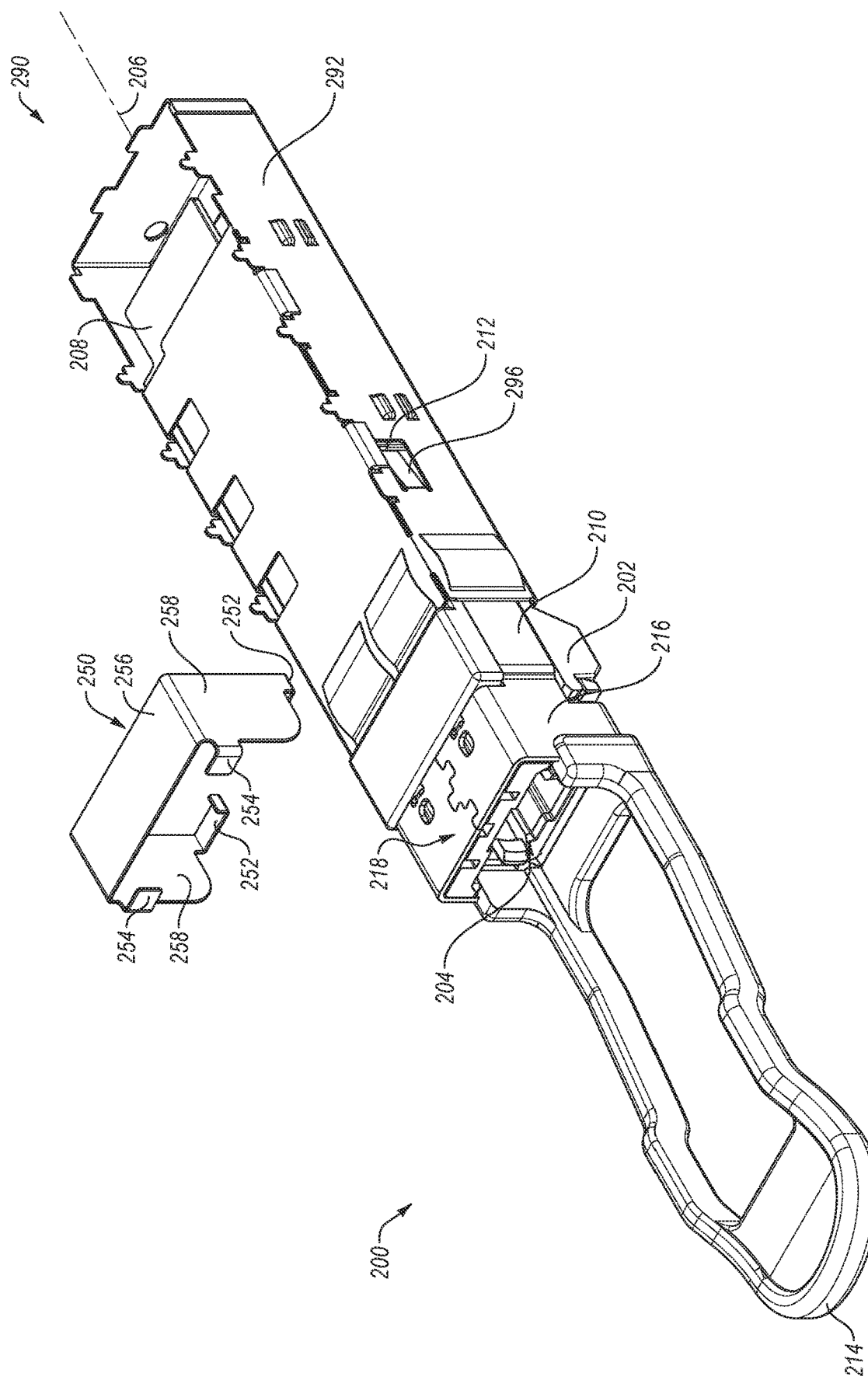

FIGS. 3B-3C are perspective views of the optoelectronic module 200 positioned inside of the cage 290. The optoelectronic module 200 may be inserted in the opening 294 and slid into the cage 290 until the housing 202 abuts the cage 290. Once the optoelectronic module 200 is positioned in the cage 290, the protrusions 212 may engage the tabs 296 to prevent the optoelectronic module 200 from being removed from the cage 290, as shown. Since the tabs 296 are resilient, they may be displaced by the protrusions 212 as the optoelectronic module 200 is inserted into the cage 290, until the protrusions 212 move beyond and abut the ends of the tabs 296, in the engaged position shown.

FIGS. 3B-3C also illustrates a retainer 250, which may be implemented to prevent the optoelectronic module 200 from unintentionally disengaging from the cage 290. Although not shown, a plug may be implemented to be positioned inside of the ports 204 to occlude the ports 204. The plug may be similar to the plug 180 described above, and may include and suitable features discussed.

As shown in FIG. 3C, the slider 116 may include a lateral portion 218 which extends between and is coupled to the arms 210. While the arms 210 extend along two opposite facing sides of the optoelectronic module 200, the lateral portion 218 may extend perpendicular to the arms 210, as shown. In the illustrated configuration, the lateral portion 218 and the arms 210 are integral with the slider 216, and form a u-shaped slider member (e.g., having a u-shaped cross-section). In such circumstances, the slider member may include two arm portions (e.g., arms 210) and the lateral portion 218 extending therebetween. However, other suitable configurations may be implemented.

As will be described in further detail below, the retainer 250 may be configured to deactivate or disable a release mechanism of the optoelectronic module 200, thereby preventing the optoelectronic module 200 from unintentionally releasing from the cage 290. Such configuration may permit network switches to be shipped with optoelectronic modules positioned in the cages, without the optoelectronic modules coming loose of their respective cages. Accordingly, the retainer 250 may prevent damage to the optoelectronic module 200 or the network switch during shipping.

As explained above, the slider 216 may move with respect to the housing 202 of the optoelectronic module 200 in a direction parallel to the longitudinal axis 206 to engage or w disengage the protrusions 212 with respect to the tabs 296. Furthermore, the handle 214 is coupled to the slider 216 to permit a user to move the slider 216 in a direction parallel to the longitudinal axis 206 to engage or disengage the optoelectronic module 200 with respect to the cage 290. In the position shown in FIGS. 3B-3C, the slider 216 is in an engaged or locked position, with the slider 216 positioned towards the electrical coupling 208 along the longitudinal axis 206. In this position, the handle 214 is also positioned towards the electrical coupling 208.

In a disengaged or unlocked position, the slider 216 may be positioned further from the electrical coupling 208 along the longitudinal axis 206. In this position, the protrusions 212 of the slider 216 may disengage the tabs 296 of the cage 290 to permit the optoelectronic module 200 to be removed from the cage 290. In particular, the protrusions 212 may displace the tabs 296 in a direction away from the optoelectronic module 200, permitting the slider 216 and the protrusions 212 to move past the tabs 296, for example, to permit the optoelectronic module 200 to be removed from the cage 290. A user may move the slider 216 to the disengaged or unlocked position by pulling on the handle 214, which is coupled to the slider 216. Thus, when a user pulls on the handle 214, the slider 216 may be moved to the disengaged or unlocked position, thereby permitting the protrusions 212 of the slider 216 to move past the tabs 296.

The slider 216 may not move beyond the disengaged or unlocked position, so when the user continues to pull on the handle 214, the entire optoelectronic module 200 will be pulled along with the handle 214, thereby pulling the optoelectronic module 200 from the cage 290. In practice, the when the user pulls on the handle 214 the optoelectronic module 200 may be removed from the cage 290 in a continuous motion, with the slider 216 first being pulled into the disengaged or unlocked position and then the optoelectronic module 200 being pulled from the cage 290.

The retainer 250 may be configured to prevent the slider 216 (and the handle 214) from w being moved with respect to the housing 202 or the rest of the optoelectronic module 200 (e.g., in the longitudinal direction) to the disengaged or unlocked position. This in turn prevents the optoelectronic module 200 from being removed from the cage, and from unintentional release from the cage 290.

As will be described in further detail below, the retainer 250 may include first protrusions 252 to engage with the housing 202 of the optoelectronic module 200 and second protrusions 254 to engage with the handle 114 of the optoelectronic module 200, to prevent the slider 216 from moving with respect to the housing 202 in a direction parallel to the longitudinal axis 206 to the disengaged or unlocked position (e.g., in a direction away from the electrical coupling 208).

As shown, the retainer 250 may be formed of or may include a sheet of generally planar material bent into a u-shaped configuration to retain the slider 216 with respect to the housing 202. The retainer 250 may include a body portion 256 extending between two oppositely positioned sides 258 of the retainer 250. In the illustrated configuration, the body portion 256 is generally planar and the sides 258 extend transverse or perpendicular to the body portion 256 and are also planar. The body portion 256 may be sized and shaped to generally corresponding to the lateral portion 218 of the slider 216 and a portion of the handle 214. In particular, the body portion 256 may include at least one dimension that is substantially the same as a corresponding dimension of the lateral portion 218 of the slider 216.

The protrusions 252 may be positioned on the sides 258 of the retainer 250 and may extend transverse or perpendicular to the sides 258, in a direction parallel to the body portion 256, towards the interior of the retainer 250 (e.g., generally towards the center of the "u" defined by the retainer 150). The protrusions 252 may include ends that extend transverse to or perpendicular to the rest of the protrusions 252, in a direction substantially parallel to the sides 258. The ends of the protrusions 252 may be sized and shaped to be positioned in the slots 260. The protrusions 254 may be positioned on the sides 258 of the retainer 250 and may extend transverse or perpendicular to the sides 258. The protrusions 254 may also extend in a direction towards the interior of the retainer 250 (e.g., generally towards the center of the "u" defined by the retainer 250). The protrusions 252 may be offset with respect to the protrusions 254 in a lateral or vertical direction, that is, the protrusions 252 may not be aligned with respect to the protrusions 254 in a lateral or vertical direction, or both. As shown, the protrusions 252 may be positioned on ends of the sides 258 and the protrusions 254 may be positioned on the sides 258 in a position proximate the body portion 256.

The housing 202 may define slots 260 sized and shaped to receive the protrusions 252. In the illustrated configuration, the housing 202 includes two slots 260 to correspond to the two protrusions 252, although any suitable number of slots and corresponding protrusions may be implemented. The slots 260 may be spaced apart from one another a distance that corresponds to the spacing between the protrusions 252, or vice versa.

The retainer 250 may be formed of a resilient material (such as a resilient metal material) to permit the retainer 250 to engage and disengage the optoelectronic module 200. In particular, the retainer 250 may be bent or otherwise manipulated to permit the retainer 250 to be positioned around the slider 216, a portion of the handle 214 and a portion of the housing 202. Once positioned to engage the optoelectronic module 200, the retainer 250 may return to its original shape as it retains the slider 216 in the engaged or locked position with respect to the housing 202, with the protrusions 252, 254 engaged with the optoelectronic module 200.

Unlike the configuration of the optoelectronic module 100 and the retainer 150, the w configuration of the optoelectronic module 100 does not include a second set of slots sized and shaped to receive the protrusions 254. Rather, the protrusions 254 are sized and positioned to surround the end of the optoelectronic module 100, to abut the slider 216 to prevent the slider 216 from being moved with respect to the housing 102, to a disengaged position. Further, the protrusions 254 are sized and positioned to surround a portion of the slider 216 to prevent the slider 216 from being moved with respect to the housing 102, to a disengaged position. Such aspects are illustrated and described in further detail with respect to FIGS. 3D-3E.

Figure 3D:
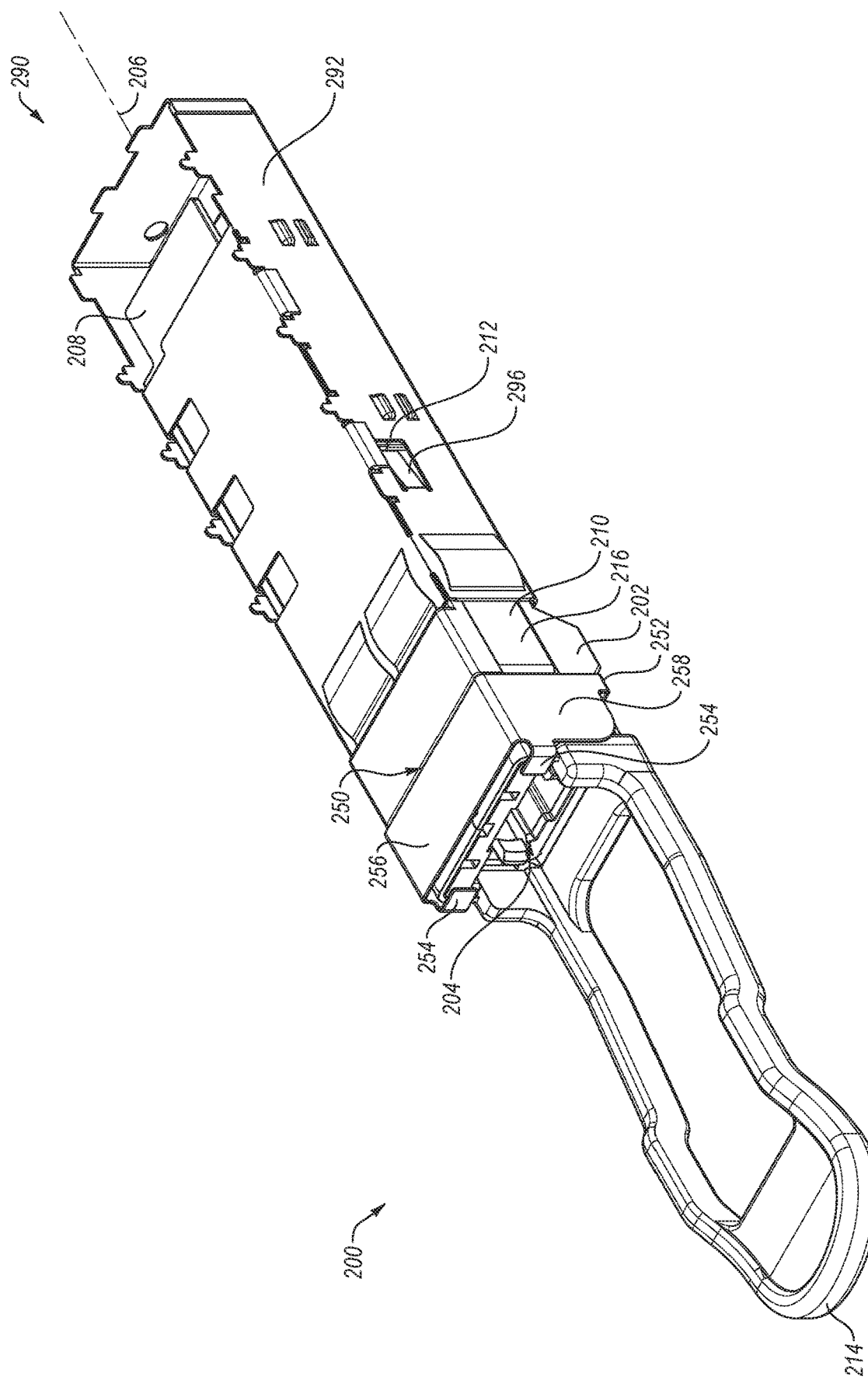
FIGS. 3D-3E are perspective views of the retainer engaged with the optoelectronic module.
Figure 3E:
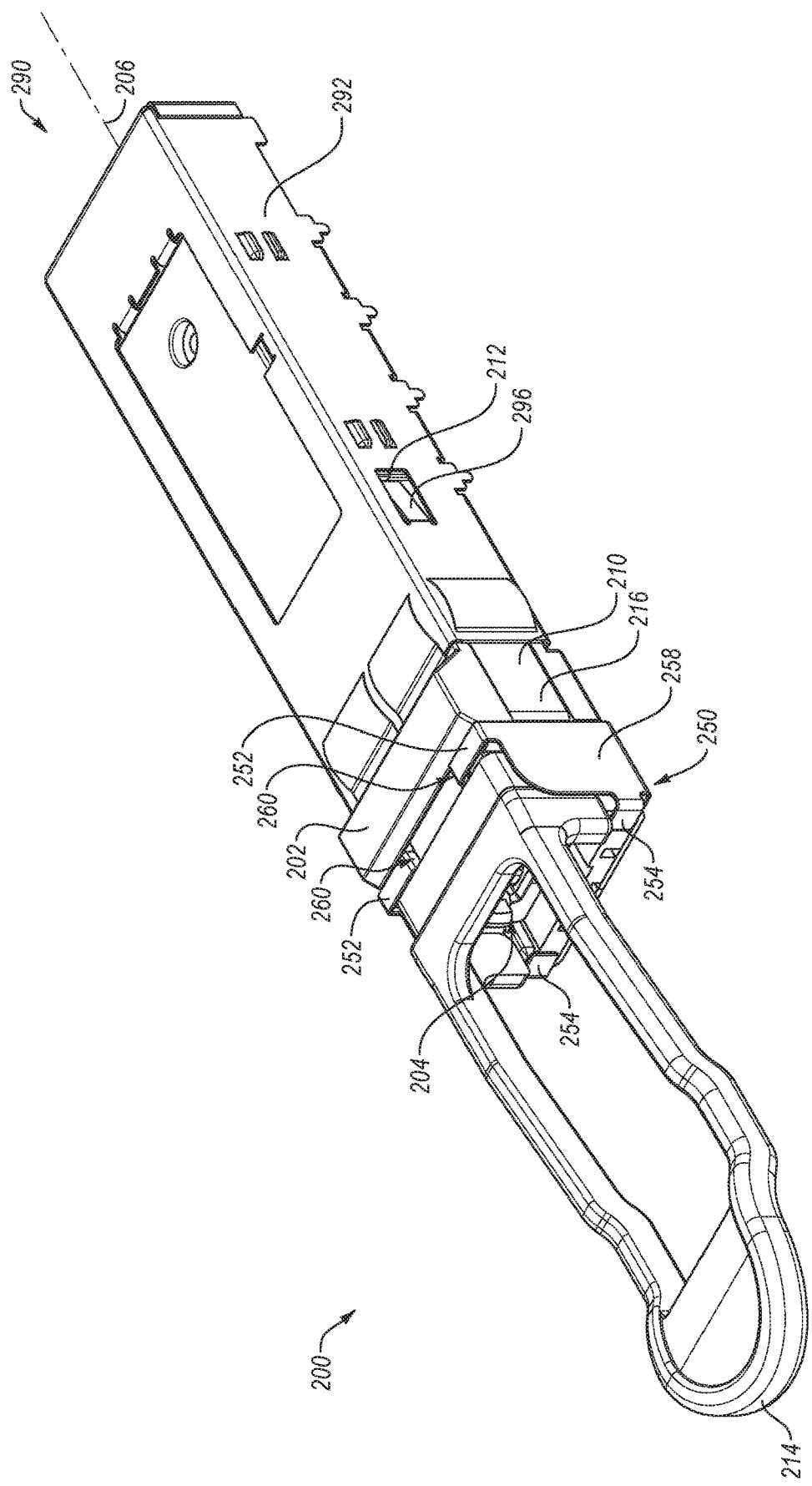

FIGS. 3D-3E are perspective views of the retainer 250 engaged with the optoelectronic module 200. In the illustrated configuration, the retainer 250 surrounds a portion of the slider 216, a portion of the handle 214 and a portion of the housing 202 to retain the slider 216 in a fixed position (e.g., the engaged or locked position) with respect to the housing 202. The protrusions 252 are positioned in the slots 260 defined by the housing 202 and the protrusions 254 surround a portion of the slider 216 and abut the slider 216 to prevent the slider 216 from being moved.

The retainer 250 may be engaged with the housing 202 to prevent the handle 214 and the slider 216 from moving with respect to the housing 202 in a direction parallel to the longitudinal axis 106 to the disengaged or unlocked position (e.g., in a direction away from the electrical coupling 208).

As shown in FIG. 3D, the body portion 256 may cover part of the lateral portion 218 of the slider 216. The sides 258 of the retainer 250 may be positioned to surround the optoelectronic module 200 and may extend generally parallel to the sides of the optoelectronic module 200 (e.g., sides of the housing 202 and the arms 210 of the slider 216). The retainer 250 may include rounded corners that generally correspond to the curvature of the slider 216 and/or the housing 202.

When the protrusions 252 are positioned in the slots 260 of the housing 202, the protrusions 252 abut the housing to retain the retainer 250 with respect to the housing 202 (e.g., to prevent the retainer 250 from moving with respect to the housing 202, and vice versa). Further, when the protrusions 254 are positioned to surround and abut the slider 216, the protrusions 254 retain the retainer 250 with respect to the slider 216 (e.g., to prevent the retainer 250 from moving with respect to the slider 216, and vice versa). Accordingly, when the retainer 250 is engaged with the housing 202 and the slider 216 (by the protrusions 252, 254), the slider 216 is retained with respect to the housing 202, thereby fixing the slider 216 with respect to the housing 202. Additionally or alternatively, when the retainer 250 is engaged with the housing 202 and the slider 216 (by the protrusions 252, 254), the handle 214 is retained with respect to the housing 202, because the handle 214 is attached to the slider 216, thereby fixing the handle 214 with respect to the housing 202.

As mentioned above, the retainer 250 may be formed of a resilient material (such as a resilient metal material) to permit the retainer 250 to engage and disengage the optoelectronic module 200. To engage the retainer 250 with the optoelectronic module 200, the sides 258 may be spread apart, for example, by a user pulling the sides 258 apart. Spreading the sides 258 apart may permit the protrusions 252 to clear the sides of the optoelectronic module 200 without interference. The retainer 250 may then be positioned around the optoelectronic module 200, for example, in the engaged position shown in FIGS. 3D-3E. In the engaged position, the protrusions 252 are positioned in the slots 260 and the protrusions 254 are positioned to abut the slider 216. Once positioned to engage the optoelectronic module 200, the retainer 250 may return to its original shape, by virtue of the resilience of the retainer 250, to retain the slider 216 and the handle 214 with respect to the housing 202 (e.g., with the protrusions 254 positioned to abut the slider 216). In this position (e.g., the engaged position), the sides 258 of the retainer 250 may abut the arms 210 of the slider 216 and/or a portion of the handle 214.

To disengage or unlock the retainer 250 with respect to the optoelectronic module 200, the sides 258 may be spread apart (for example, by a user pulling the sides 258 apart), which in turn may remove the protrusions 252 from the slots 260, and may also permit the protrusions 252 to clear the sides of the optoelectronic module 200 without interference. The retainer 250 may then be removed from contacting the optoelectronic module 200, and the protrusions 254 may be removed their position abutting the slider 216. With the retainer 250 removed, the handle 214 and the slider 216 may be actuated to remove the optoelectronic module 200 from the cage 290.

Figure 4A:
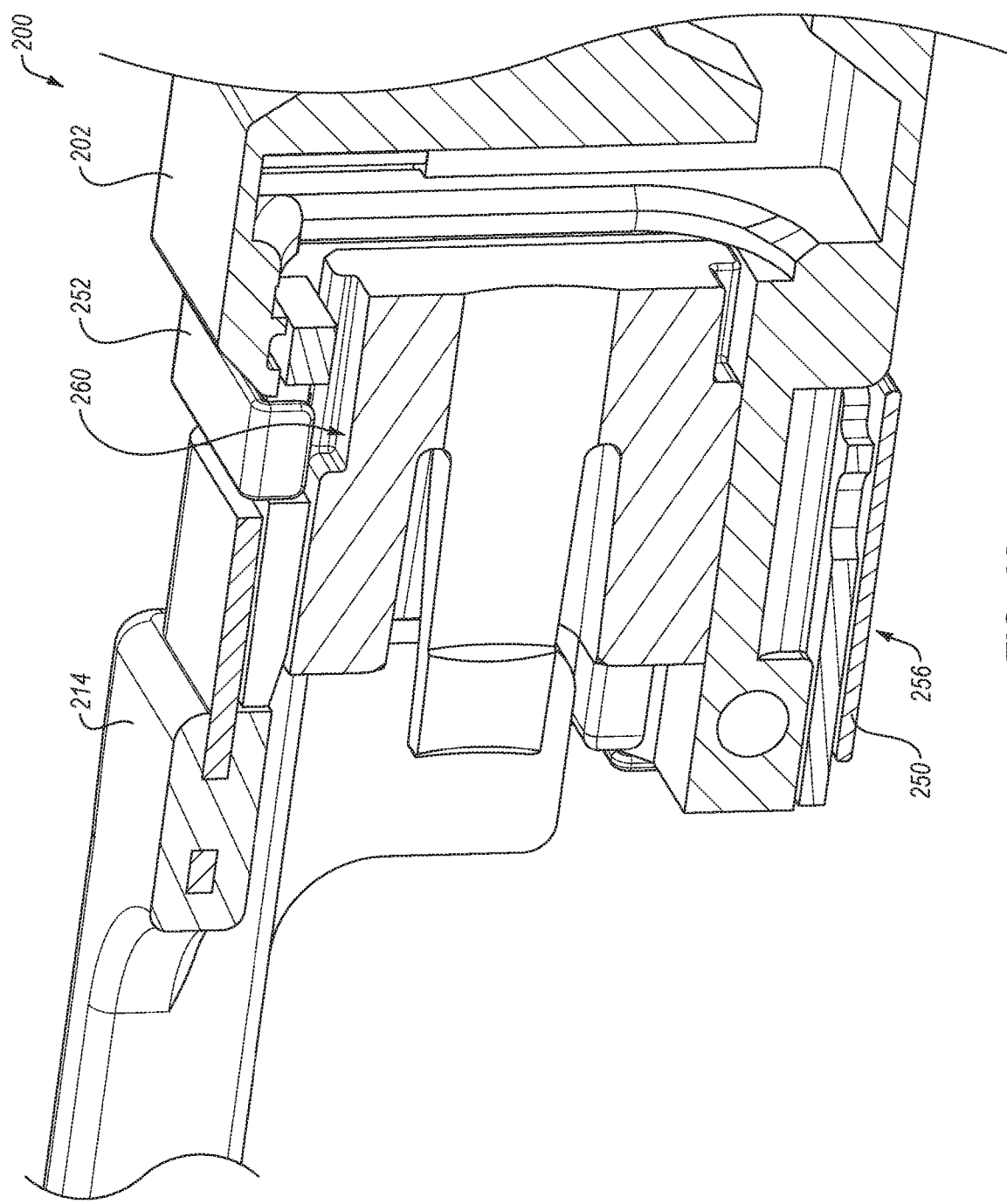
FIG. 4A is a section view of the retainer and a portion of the optoelectronic module.

FIG. 4A is a section view of a portion of the optoelectronic module 200 and the retainer 250. In particular, FIG. 4A is a perspective view of the retainer 250 engaged with the optoelectronic module 200. As shown in FIG. 4A, the protrusions 252 are positioned in the slots 260 defined by the housing 202. In this position (e.g., the engaged position), the protrusions 252 are engaged with and abut the housing 202. This may in turn prevent the retainer 250 from moving with respect to the housing 202. Furthermore, the protrusions 254 may engage with and abut the slider 216, thereby fixing the retainer 250 with respect to the slider 216.

Thus, in the engaged position, the retainer 250 is fixed with respect to both the housing 202 and the slider 216. Since the handle 214 is coupled to the slider 216, the retainer 250 also retains the handle 214 with respect to the housing 202. This in turn prevents the slider 216 from moving with respect to the housing 202 to deactivate or disable the release mechanism of the slider 216, thereby preventing release of the optoelectronic module 200 from the cage 290. Additionally or alternatively, since the retainer 250 is fixed with respect to both the housing 202 and the slider 216, this prevents the slider 216 from moving with respect to the housing 202 in a direction parallel to the longitudinal axis 206 to the disengaged or unlocked position.

Although FIG. 4A illustrate only a portion of the retainer 250 and the optoelectronic module 200 (e.g., one side), and thus only one of the protrusion 252 and corresponding slots 260 are shown, it should be appreciated that the engaging and disengaging movement described may apply to the other side of the retainer 250 and the optoelectronic module 200.

Figure 4B:
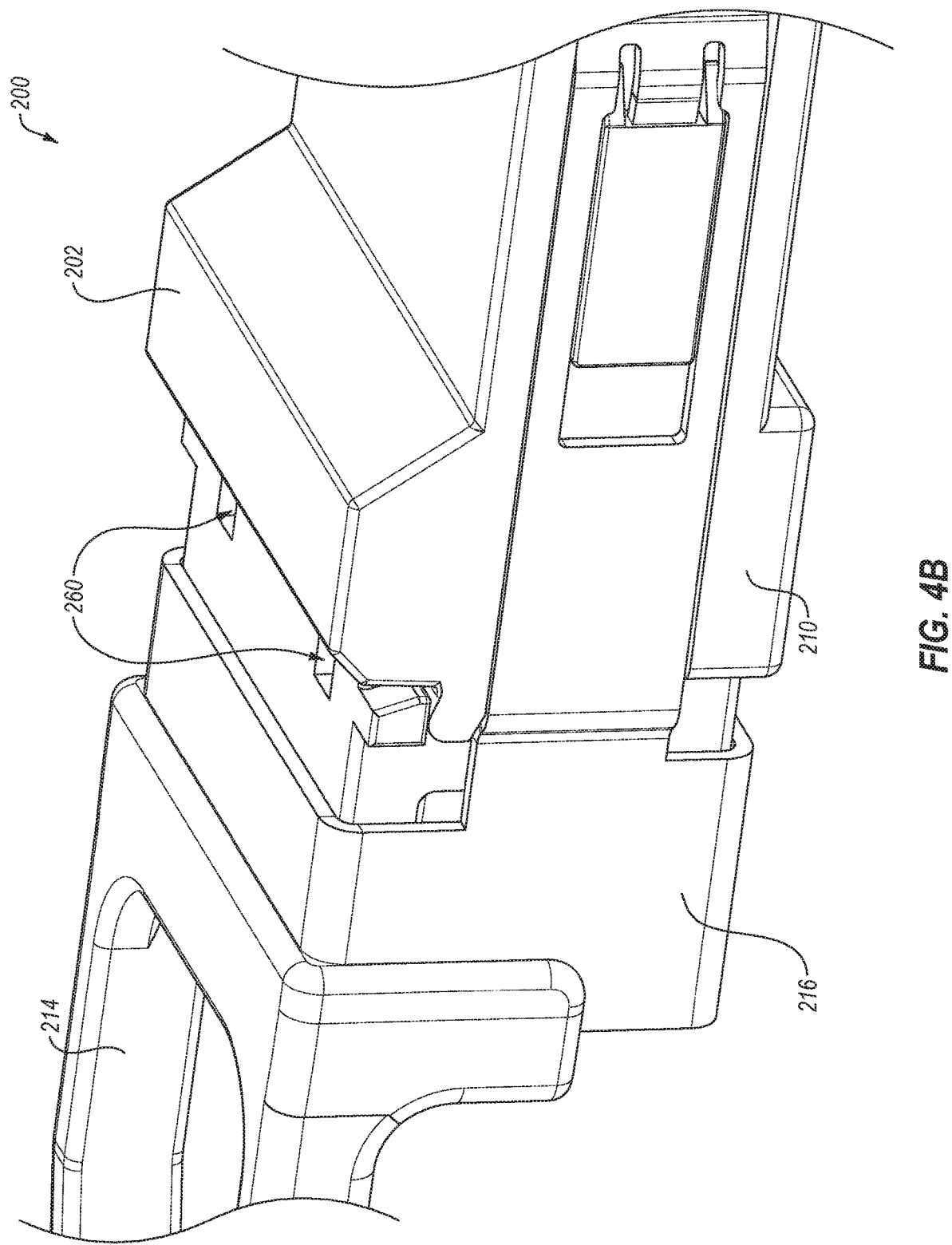
FIG. 4B is a perspective view of a portion of the optoelectronic module.

FIG. 4B is a perspective view of a portion of the optoelectronic module 200 with the retainer 250 removed, with the optoelectronic module 200 in a disengaged or unlocked position. When the retainer 250 is not engaged with the optoelectronic module 200 (e.g., by restricting movement of the slider 216), the slider 216 may move with respect to the housing 202 to the disengaged or unlocked position shown. For example, a user may move the slider 216 to the disengaged or unlocked position by pulling on the handle 214, which is coupled to the slider 216.

In the disengaged or unlocked position, the slider 216 may be positioned further along the longitudinal axis 206 away from the cage 290, as shown. In this position, the protrusions 212 of the slider 216 may disengage the tabs 296 of the cage 290 to permit the optoelectronic module 200 to be removed from the cage 290. Furthermore, the slider 216 may not move beyond the disengaged or unlocked position shown, so when the user continues to pull on the handle 214, the entire optoelectronic module 200 will be pulled along with the handle 214, thereby removing the optoelectronic module 200 from the cage 290.

As explained above, the disclosed configurations of the retainer 250 may deactivate or disable the release mechanism of the optoelectronic module 200, to prevent the optoelectronic module 200 from unintentionally releasing from the cage 290, for example, during shipping or transport. In particular, the retainer 250 may be implemented to deactivate or disable the slider 216 release mechanism, thereby preventing the optoelectronic module 200 from being removed from the cage 290, which may be implemented in a network switch.

In one example, a method of engaging the retainer 250 with the optoelectronic module 200 may include spreading the sides 258 of the retainer 250, for example, by a user pulling the sides 258 apart. The sides 258 may be coupled to one another by the boy portion 256. Spreading the sides 258 apart may permit the protrusions 252 to clear the sides of the optoelectronic module 200 without interference. The method may include positioning the retainer 250 around the optoelectronic module 200, for example, in the engaged position shown in FIGS. 3D-3E. In the engaged position, the protrusions 252 are positioned in the slots 260 and the protrusions 254 abut the slider 216. Once positioned to engage the optoelectronic module 200, the retainer 250 may return to its original shape, by virtue of the resilience of the retainer 250, to retain the slider 216 with respect to the housing 202 (e.g., with the protrusions 252 positioned in the slots 260). In this position (e.g., the engaged position), the sides 258 of the retainer 250 may abut the arms 210 of the slider 216 and/or a portion of the handle 214.

In some aspects, the method of engaging the retainer 250 with the housing 202 may include abutting the protrusion 252 of the retainer 250 against the housing 202 in the slot 260, and abutting the protrusion 254 of the retainer 250 against the slider 216 (or the handle 214). To deactivate or disable the slider 216 release mechanism, the retainer 250 engages the slider 216 and the housing 202 to prevent the slider 216 from moving to the disengaged or unlocked position. Since the retainer 250 abuts the slider 216 and is also secured to the housing 202 by the protrusions 252, the slider 216 is prevented from moving to the disengaged or unlocked position until the retainer 250 is removed.

In another example, a method of disengaging the retainer 250 with the optoelectronic module 200 may include spreading apart the sides 258 of the retainer 250 (for example, by a user pulling the sides 258 apart). The sides 258 may be coupled to one another by the boy portion 256. The method may include removing the protrusions 254 from the slots 262 (e.g., by pulling the sides 258 apart), which may in turn permit the protrusions 254 to clear the sides of the optoelectronic module 200 without interference. The method may include removing the retainer 250 from contacting the optoelectronic module 200. The method may include removing the protrusions 252 from the slots 260. In some configurations, removing the protrusions 252 from the slots 260 may before the protrusions 254 are moved from their position abutting the slider 216. With the retainer 250 removed, the handle 214 and the slider 216 may be actuated to remove the optoelectronic module 200 from the cage 290.

In some configurations, the protrusions 252 and the protrusions 254 may be integral with respect to the body of the retainer 250. That is, retainer 250 including the protrusions 252 and the protrusions 254 may be formed of a single piece of material. Additionally or alternatively, the sides 258 and the body portion 256 may be integral with respect to the body of the retainer 250. That is, retainer 250 including the sides 258 and the body portion 256 may be formed of a single piece of material.

In the illustrated configuration, two of the protrusions 252, 254 are included, with one on each side of the retainer 250. However, the retainer 250 may include any suitable number of the protrusions 252, 254. For example, the retainer 250 may include one protrusion, or more than two protrusions. Further, other suitable features besides protrusions may be implemented to engage with the housing 202.

Unless specific arrangements described herein are mutually exclusive with one another, the various implementations described herein can be combined to enhance system functionality or to produce complementary functions. Likewise, aspects of the implementations may be implemented in standalone arrangements. Thus, the above description has been given by way of w example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optoelectronic module for use with a cage, the module comprising:
   a housing enclosing at least one optical transmitter or receiver, the housing defining a first slot;
   a slider configured to move between disengaged and engaged positions with respect to the housing, the slider including at least one protrusion, the at least one protrusion with the slider in the engaged position being configured to releasably engage with the cage sized and shaped to receive the housing;
   a retainer configured to removably engage both the slider and the housing to retain the slider in the engaged position with respect to the housing, the retainer including a first protrusion sized and shaped to be positioned in the first slot defined by the housing, and a second protrusion sized and shaped to abut the slider.

2. The optoelectronic module of claim 1, wherein the retainer comprises a body portion extending between two oppositely positioned sides, and the first protrusion or the second protrusion is positioned on one of the sides.

3. The optoelectronic module of claim 2, wherein the first protrusion is positioned on the body portion and the second protrusion is positioned on one of the sides.

4. The optoelectronic module of claim 3, wherein the first protrusion extends transverse to the body portion and the second protrusion extends transverse to the sides.

5. The optoelectronic module of claim 2, wherein the second protrusion is positioned within and is surrounded by an opening defined in the sides of the retainer.

6. The optoelectronic module of claim 1, wherein the second protrusion is sized and shaped to be positioned in a second slot cooperatively defined between the slider and a handle, the handle coupled to the slider.

7. The optoelectronic module of claim 1, wherein the first protrusion and the second protrusion extend towards an interior of the retainer.

8. The optoelectronic module of claim 2, wherein the first protrusion and the second protrusion are positioned on the sides of the retainer.

9. The optoelectronic module of claim 8, wherein the first protrusion and the second protrusion extend transverse to the sides.

10. The optoelectronic module of claim 9, the first protrusion including an end sized and shaped to be positioned in the slot defined by the housing.

11. The optoelectronic module of claim 9, wherein the first protrusion is positioned on an end of one of the sides and the second protrusion is positioned on one of the sides in a position proximate the body portion.

12. The optoelectronic module of claim 1, wherein the second protrusion is sized and shaped to surround and abut a portion of the slider to prevent the slider from being moved with respect to the housing to the disengaged position.

13. The optoelectronic module of claim 1, wherein the retainer comprises a planar material bent into a u-shaped configuration, and the retainer is formed of a resilient material to permit the retainer to be engaged with the housing and the slider.

14. The optoelectronic module of claim 1, wherein the retainer disables a release mechanism of the slider when engaged with the housing and the slider.

15. The optoelectronic module of claim 2, wherein the body portion includes at least one dimension corresponding to a dimension of a lateral portion of the slider.

16. The optoelectronic module of claim 1, further comprising a handle coupled to the slider, wherein the retainer is sized and shaped to surround at least a portion of both the handle and the slider in the engaged position.

17. The optoelectronic module of claim 1, wherein the slider is configured to move in a direction parallel to a longitudinal axis of the housing, the protrusion of the slider is configured to engage a corresponding resilient tab of the cage, the slider includes at least one arm extending along the housing, and the protrusion of the slider is positioned on the arm.

18. A method comprising:
   inserting a housing of an optoelectronic module in a cage sized and shaped to receive the housing;
   moving a slider on the housing from a disengaged position and to an engaged position to releasably engage with the cage;
   spreading apart sides of a retainer, wherein the sides of the retainer are coupled to one another by a body portion; and
   removably engaging the retainer between the housing and the slider in the engaged position on the housing by positioning a first protrusion of the retainer in a first slot defined by the housing of the optoelectronic module; and engaging a second protrusion with the slider of the optoelectronic module;
   wherein positioning the first protrusion in the first slot and engaging the second protrusion with the slider retains the slider with respect to the housing.

19. The method of claim 18, further comprising positioning the second protrusion in a second slot cooperatively defined between the slider and a handle, the handle coupled to the slider.

20. The method of claim 18, further comprising positioning the second protrusion to abut a portion of the slider to prevent the slider from being moved with respect to the housing to the disengaged position.

* * * * *